US007076236B2

(12) United States Patent
Ihira et al.

(10) Patent No.: US 7,076,236 B2
(45) Date of Patent: Jul. 11, 2006

(54) PORTABLE RADIO COMMUNICATION TERMINAL AND CALL CENTER APPARATUS

(75) Inventors: Yasuhisa Ihira, Toyonaka (JP); Koji Yamamoto, Hirakata (JP); Hirokazu Masuda, Katano (JP); Kazuyasu Yamane, Moriguchi (JP); Takemasa Shoji, Suita (JP)

(73) Assignee: Matsushita Electric Works, Ltd., Osaka (JP)

( * ) Notice: Subject to any disclaimer, the term of this patent is extended or adjusted under 35 U.S.C. 154(b) by 368 days.

(21) Appl. No.: 10/427,967

(22) Filed: May 2, 2003

(65) Prior Publication Data

US 2004/0029610 A1 Feb. 12, 2004

(30) Foreign Application Priority Data

Jun. 10, 2002 (JP) ............................. 2002-168865

(51) Int. Cl.
*H04M 11/04* (2006.01)
*H04Q 7/20* (2006.01)

(52) U.S. Cl. ............................. 455/404.1; 455/456.4; 455/521

(58) Field of Classification Search ............. 455/404.1, 455/521, 456.4
See application file for complete search history.

(56) References Cited

U.S. PATENT DOCUMENTS

| 5,093,658 | A | * | 3/1992 | Grothause ..................... 455/73 |
| 5,305,370 | A | * | 4/1994 | Kearns et al. ................. 379/45 |
| 5,479,476 | A | | 12/1995 | Finke-Anlauff |
| 6,035,217 | A | | 3/2000 | Kravitz |
| 6,140,956 | A | | 10/2000 | Hillman et al. |
| 6,226,510 | B1 | * | 5/2001 | Boling et al. ............. 455/404.2 |
| 6,320,535 | B1 | | 11/2001 | Hillman et al. |
| 6,480,826 | B1 | * | 11/2002 | Pertrushin ................... 704/270 |
| 6,522,265 | B1 | | 2/2003 | Hillman et al. |
| 6,847,814 | B1 | * | 1/2005 | Vogeleisen ............... 455/404.1 |
| 2003/0023444 | A1 | | 1/2003 | St. John |
| 2004/0203842 | A1 | * | 10/2004 | Hanninen et al. ........ 455/456.1 |

FOREIGN PATENT DOCUMENTS

| EP | 0611070 | 8/1994 |
| WO | WO 97/50235 | 12/1997 |
| WO | WO 01/16936 | 3/2001 |

OTHER PUBLICATIONS

European Search Report of EP No. 03252837.

* cited by examiner

*Primary Examiner*—Barry Taylor
(74) *Attorney, Agent, or Firm*—Greenblum & Bernstein, P.L.C.

(57) ABSTRACT

A portable radio communication terminal is provided comprising: a radio transmitter/receiver for transmitting and receiving signals over a public mobile communications network, a microphone unit and a loudspeaker unit for entering and releasing the communication signals to be transmitted and received by the radio transmitter/receiver, a light emitter for emitting light to indicate details of an action, an operation entering unit, and a controller. When the normal mode is selected with the operation entering unit, the controller turns the microphone unit, the loudspeaker unit, and the light emitter on to start the communication via the radio transmitter/receiver to a predetermined emergency call station. When the static mode is selected with the operation entering unit, the controller turns the loudspeaker unit and the light emitter off while holding the microphone turned on to start the access via the radio transmitter/receiver to the emergency call station. Accordingly, even if the user is under an unfavorable condition for producing an emergency call, it can provide the emergency call station with a data about its difficult condition.

16 Claims, 30 Drawing Sheets

| CONDITION | MICROPHONE | LOUD-SPEAKER | LIGHT EMITTER (LED ETC.) |
|---|---|---|---|
| STAND-BY | OFF | OFF | OFF |
| START-UP | ON | ON | FLASHING/LIGHTING |

PORTABLE RADIO COMMUNICATION TERMINAL AND CALL CENTER APPARATUS

BACKGROUND OF THE INVENTION

1. Field of the Invention

The present invention relates to a portable radio communication terminal designed for allowing a predetermined emergency call station to monitor the status of a user and its ambient conditions over a public radio telecommunications network and to a call center apparatus provided at the emergency call station.

2. Description of the Related Art

FIGS. 28 and 29 illustrate a conventional portable radio communication terminal and a communications system including the conventional portable radio communication terminal respectively. FIGS. 30A and 30B show an action of the system. The system consists mainly of the portable radio communication terminal 1PA, a call center 2, a police station 3, a group of GPS satellites 4, a radio communications line base station 5, and a public communications network 6.

The portable radio communication terminal 1PA comprises a radio transmitter/receiver 11 for transmitting and receiving signals over the public radio communications network, a microphone 12 and a loudspeaker 13 for producing and emitting the transmitting and received signals of the radio transmitter/receiver 11, a light emitter 14 for emitting light to display the action, an operation entry unit 15PA, and a controller 10PA for starting the transmission of a signal via the radio transmitter/receiver 11 to the predetermined emergency call station in response to the action of the operation entry unit 15PA for emergency call. The emitter 14 provides various indications including the storage level of an electric cell(s), the switching on of the signal transmission, and the intensity of a received signal showing "out of range" or "in range".

The system permits the user to communicate with the call center 2 from the radio transmitter/receiver 11 over the public radio or cable communications network 6 through operating the operation entry unit 15PA of the conventional portable radio communication terminal 1PA. In turn, a reply of voice sounds from the operator at the call center 2 can be heard from the loudspeaker 13 as shown in FIG. 30B (where the reply indicates "What is wrong?") with the emitter 14 flashing on and off.

However, when the operation entry unit of the conventional portable radio terminal is operated by the user to produce an emergency call for reporting, e.g., robbery or kidnapping, the loudspeaker as a voice sound releasing means releases a voice sound and the light emitter as a light emitting means emits flashing or continuous light. This may allow the criminal to notice the sending of the emergency call hence creating a more risky situation.

SUMMARY OF THE INVENTION

The present invention has been developed in view of the above aspect and its object is to provide a portable radio communication terminal capable of producing and transmitting an emergency call even under an unfavorable condition where the transmission of the emergency call has to be carried out not in openness and a call center apparatus capable of recognizing the unfavorable condition of a user of the portable radio communication terminal.

For achievement of the object of the present invention, a portable radio communication terminal is provided comprising: a radio transmitter/receiver for transmitting and receiving signals over a public mobile communications network; a voice input unit and a voice output unit for entering and releasing the communication signals to be transmitted and received by the radio transmitter/receiver; a light emitter for emitting light to indicate details of an action; an operation entering unit; and a mode selecting controller for, when a normal emergency call mode (referred to as a normal mode) of the action is selected with the operation entering unit, shifting the action to the normal mode where the voice input unit, the voice output unit, and the light emitter are turned on and the access via the radio transmitter/receiver to a predetermined emergency call station is connected or, when a static emergency call mode (referred to as a static mode) of the action is selected with the operation entering unit, shifting the action to the static mode where the voice input unit remains turned on while the voice output unit and the light emitter are turned off and the access via the radio transmitter/receiver to the predetermined emergency call station is connected.

The present invention allows the access to the predetermined emergency call station to be connected via the radio transmitter/receiver when the static mode is selected for emergency call. Simultaneously, while the voice input unit remains turned on to start the communication from the user of the portable radio communication terminal to the emergency call station, the action of the voice output unit and the light emitter is canceled. Accordingly, the emergency call from the user can be hidden from the others around. More particularly, even if the user is in unfavorable condition for emergency call, it can readily provide the emergency call station with its emergency situation. This may significantly be advantageous when the user is seized.

DETAILED DESCRIPTION OF THE PREFERRED EMBODIMENTS

First Embodiment

Figure 1:
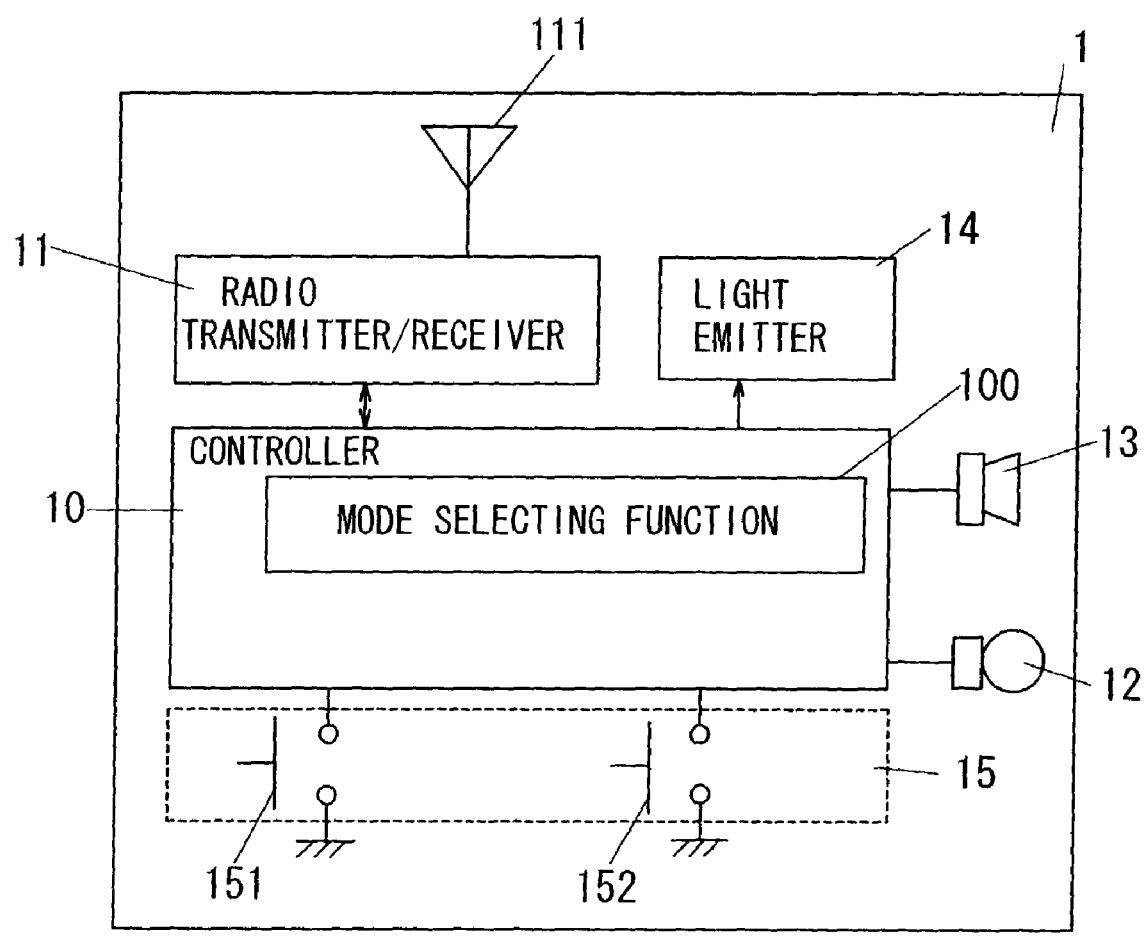
FIG. 1 is a schematic illustration of a portable radio communication terminal showing a first embodiment of the present invention.
Figure 2:
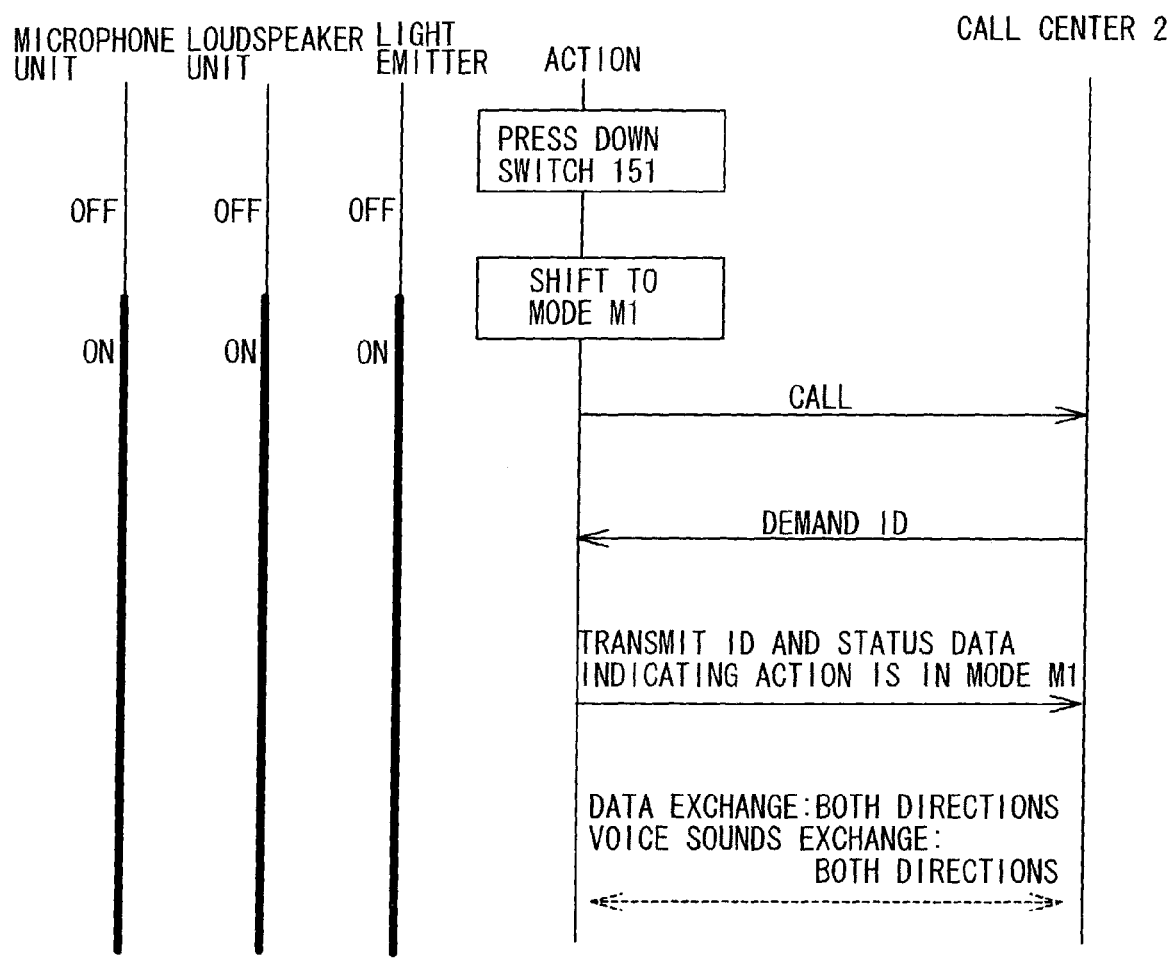
FIG. 2 is a diagram explaining the action of a normal mode of the portable radio communication terminal.
Figure 3:
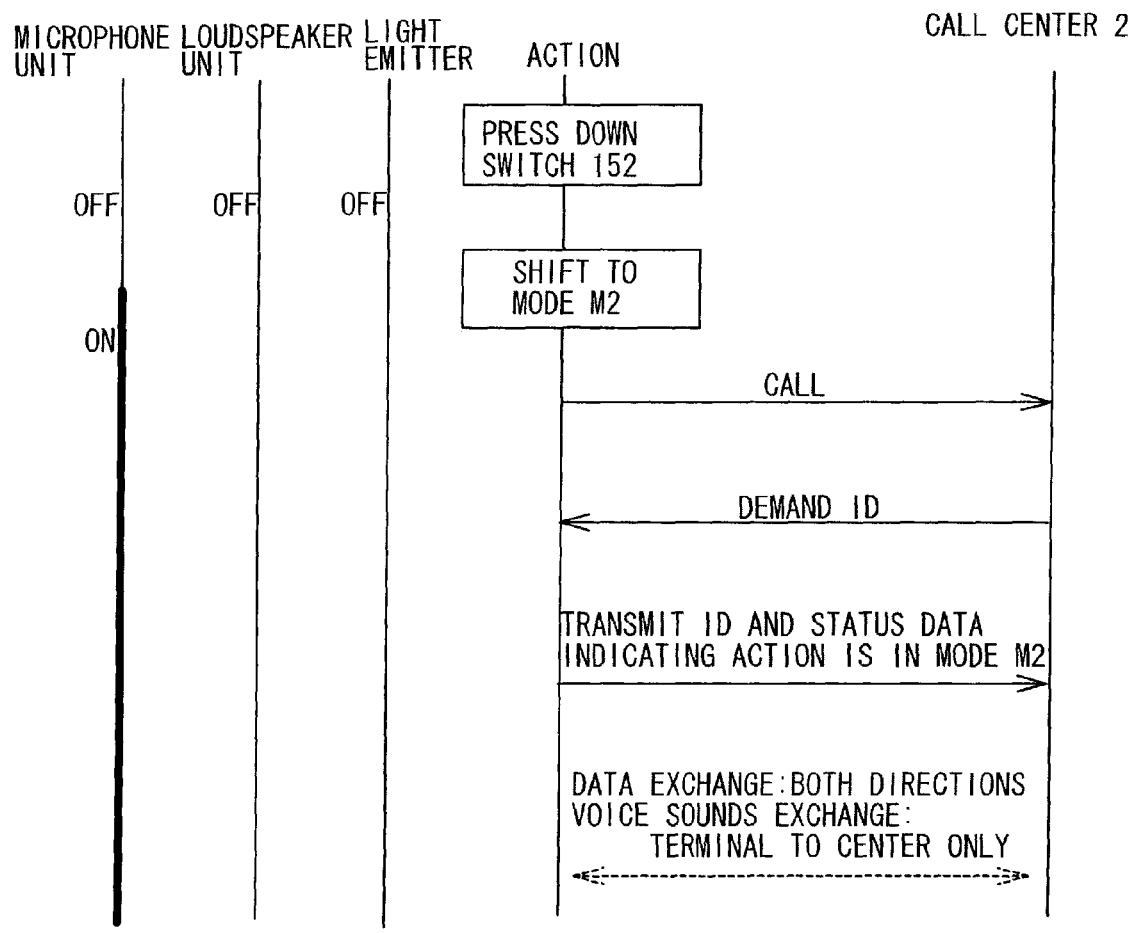
FIG. 3 is a diagram explaining the action of a static mode of the portable radio communication terminal.

FIGS. 1 to 3 illustrate a first embodiment of the present invention.

A portable radio communication terminal 1 of the first embodiment is designed for producing and transmitting an emergency call by radio to a predetermined site such as an emergency call center or a home and, as shown in FIG. 1, comprises a radio transmitter/receiver 11, a microphone unit 12, a loudspeaker unit 13, a light emitter 14, an operation entering unit 15, and a controller 10.

The radio transmitter/receiver 11 includes an antenna 111 and its arrangement is similar to that of a data communication compatible PHS for transmitting and receiving signals over a public mobile communications network.

The microphone unit 12 may comprise a microphone, an amplifier for amplifying an audio signal produced by the microphone and including the ambient sounds and the voice of a user of the portable radio communication terminal 1, and an A/D converter for converting the analog audio signal amplified by the amplifier into a digital audio data as is designed for producing the signal to be transmitted from the radio transmitter/receiver 11.

The loudspeaker unit 13 may comprise a D/A converter for converting a digital audio-data received from the radio transmitter/receiver 11 into an analog signal, an amplifier for amplifying the audio signal converted by the D/A converter, and a loudspeaker for releasing the amplified audio signal as is designed for releasing an acoustic form of the audio signal received by the radio transmitter/receiver 11.

The light emitter 14 may comprise a set of LEDs for emitting light to indicate the action of the portable radio communication terminal 1. For example, the status of communication and the mode of a selected operation can be displayed with the LEDs.

The operation entering unit 15 comprises a normal mode switch 151 for operating a normal emergency call mode (referred to as a normal mode hereinafter) and a static mode switch 152 for operating a wait-and-see emergency call mode (referred to as a static mode hereinafter). FIG. 1 illustrates the switches of a push type.

The controller 10 comprises a CPU, a RAM, and a ROM assembled for controlling the entire action of the portable radio communication terminal 1 and having a mode selecting function 100.

The mode selecting function 100 allows the normal mode to be selected by pressing the normal mode switch 151 of the operation entering unit 15 thus turning the microphone unit 12, the loudspeaker unit 13, and the light emitter 14 on to start the communication via the radio transmitter/receiver 11 with a predetermined station to be called. Similarly, when the static mode switch 152 of the operation entering unit 15 is pressed down to select the static mode, the microphone unit 12 is turned on while the loudspeaker unit 13 and the light emitter 14 remain inactivated thus starting the communication via the radio transmitter/receiver 11 with the predetermined station to be called.

The action of the portable radio communication terminal 1 will be explained in more detail. When the normal mode switch 151 is pressed down as shown in FIG. 2, the action shifts to the normal mode M1 where the microphone unit 12, the loudspeaker unit 13, and the light emitter 14 are turned on to start the communication via the radio transmitter/receiver 11 with the predetermined station to be called (a call center 2 in FIG. 2). Then, when demanded by the call center 2 for identification, an ID assigned to the portable radio communication terminal 1 is transmitted from the radio transmitter/receiver 11 to the call center 2 together with a status data which indicates that the action is in the normal mode M1. As the call center 2 receives the ID and the status data, the communication between the portable radio communication terminal 1 and the call center 2 can start for exchange of data and voice sounds.

When the static mode switch 152 is pressed down as shown in FIG. 3, the action shifts to the static mode M2 where the loudspeaker unit 13 and the light emitter 14 are inactivated with the microphone unit 12 remaining turned on, hence starting the communication via the radio transmitter/receiver 11 with the call center 2. Then, when demanded by the call center 2 for identification, an ID assigned to the portable radio communication terminal 1 is transmitted from the radio transmitter/receiver 11 to the call center 2 together with a status data which indicates that the action is in the static mode M2. As the call center 2 receives the ID and the status data, the communication between the portable radio communication terminal 1 and the call center 2 can start for exchange of data and voice sounds. More specifically, the data exchange can be carried out in both directions while the transmission of voice sounds is substantially in one way from the portable radio communication terminal 1 to the call center 2.

As described, the static mode allows the use of the portable radio communication terminal 1 to produce and transmit an emergency call from the radio transmitter/receiver 11 to the predetermined station through switching the microphone unit 12, the loudspeaker unit 13, and the light emitter 14 between an on action and an off action particularly while having no one near to know the transmission of the emergency call. Accordingly, even under an unfavorable condition where the transmission of an emergency call has to be carried out not in openness, the emergency call including information about the unfavorable condition can readily be transmitted. As the result, the call station accessed by the user can provide an appropriate response to the emergency call.

While the signals transferred from the radio transmitter/receiver 11 to the loudspeaker unit 13 and from the microphone unit 12 to the radio transmitter/receiver 11 are of a digital form in the first embodiment, they may be of an analog form. In this case, the radio transmitter/receiver 11 is connected to analog ports of the microphone unit 12 and the loudspeaker unit 13 and a switch turned on and off by the controller 10 is provided across each connection between the radio transmitter/receiver 11 and the analog port.

Second Embodiment

A second embodiment of the present invention is substantially similar to that of the first embodiment, and is different from the first embodiment in respect to a function of the mode switches 151 and 152 in FIG. 1. The mode switches 151 and 152 are alternated to two normal mode switches. It may include three or more of the normal switches.

The mode selecting function 100 is designed for operating a normal mode, which is equal to that of the first embodiment, when one of the two normal mode switches is turned on. Also, when the two normal mode switches are turned on at one time, the function 100 shifts the operation to a static mode which is equal to that of the first embodiment.

As described, the action is shifted to the static mode only when the two normal mode switches are turned on at one time. Accordingly, no shift to the static mode by any erratic action will be permitted. It is also unnecessary to provide a static mode switch separately.

Third Embodiment

A third embodiment of the present invention includes an another mode switch (not shown in FIG. 1) in addition to the mode switches 151 and 152. Among them, one is a normal mode switch and the other two are static mode switches.

The mode selecting function 100 is designed for operating a normal mode, which is equal to that of the first embodiment, when the normal mode switch is turned on. Also, when the two static mode switches are turned on at one time, the function 100 shifts the operation to a static mode which is equal to that of the first embodiment.

As described, the action is shifted to the static mode only when the two static mode switches are turned on at one time. Accordingly, no shift to the static mode by any erratic action will be permitted.

Fourth Embodiment

Figure 4:
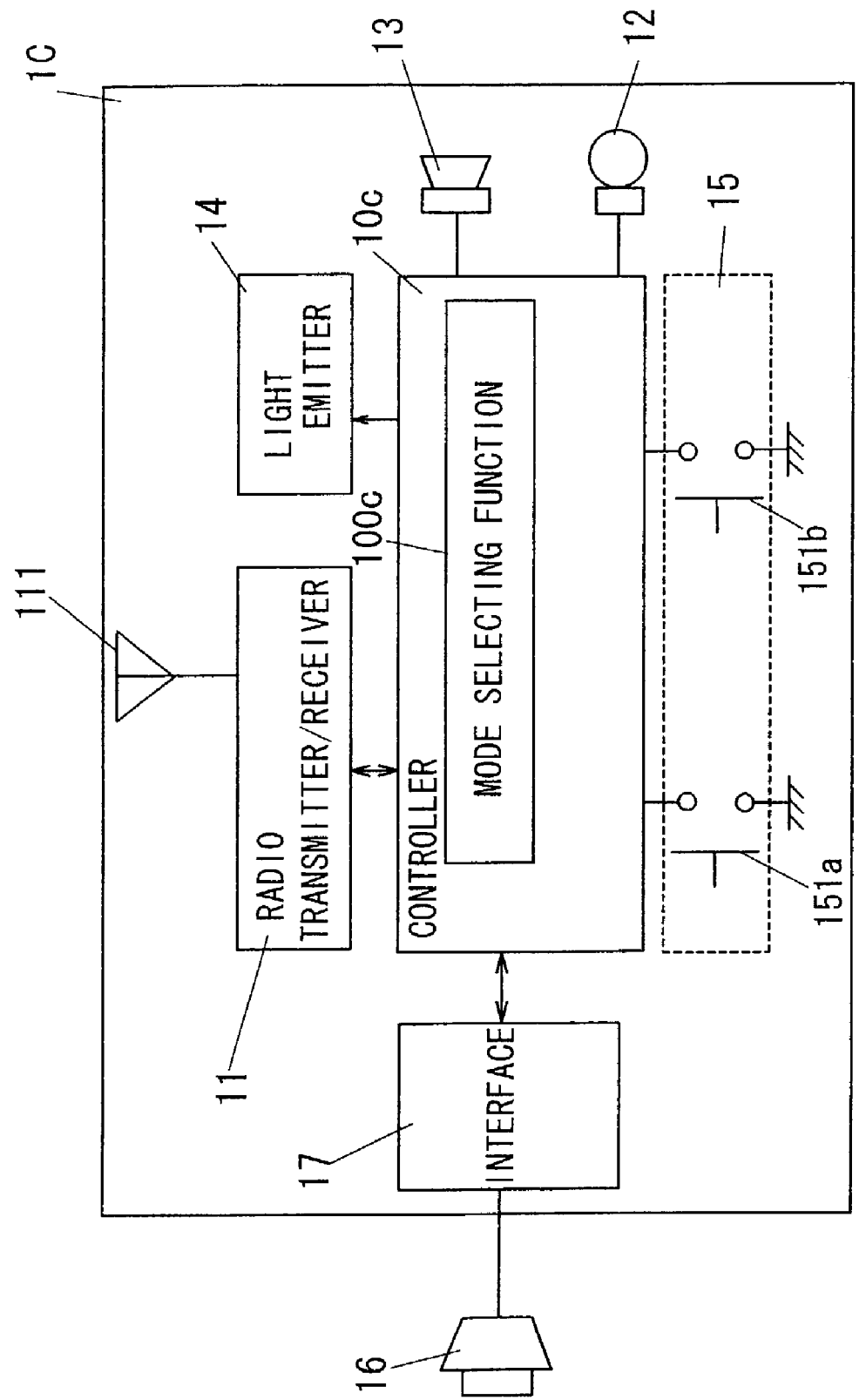
FIG. 4 is a schematic illustration of a portable radio communication terminal showing a fourth embodiment of the present invention.

FIG. 4 illustrates a fourth embodiment of the present invention.

A portable radio communication terminal 1C of the fourth embodiment is similar to that of the first embodiment, as shown in FIG. 4, comprising a radio transmitter/receiver 11, a microphone unit 12, a loudspeaker unit 13, a light emitter 14, and an operation entering unit 15. As is different from the first embodiment, the portable radio communication terminal 1C of this embodiment includes an external entry unit 16 (a push-button switch in FIG. 4), an interface 17 for connection with the external entry unit 16, and a controller 10c.

The controller 10c is substantially identical to the controller 10 of the first embodiment, except that the mode selecting function 100 is replaced by a further mode selecting function 100c. The further mode selecting function 100c unlike the function 100 of the first embodiment is designed for operating a static mode, which is equal to that of the first embodiment, when the external entry unit 16 connected via the interface 17 is turned on.

The action of the portable radio communication terminal 1C of this embodiment which is different from that of the first embodiment will now be explained. When the external entry unit 16 is turned on, the action shifts to the static mode where the microphone unit 12 remains turned on while the loudspeaker unit 13 and the light emitter 14 are turned off and the access via the radio transmitter/receiver 11 to a call center 2 is connected. Upon being demanded from the call center 2 for receiving an ID, the portable radio communication terminal 1C provides the call center 2 with its assigned ID and a status data which indicates that the action is in the static mode. As the call center 2 accepts the ID, the communications between the portable radio communication terminal 1C and the call center 2 can be started for exchange of data and voice sounds. More specifically, the data exchange can be carried out in both directions while the transmission of voice sounds is substantially in one way from the portable radio communication terminal 1C to the call center 2.

As described, a combination of the external entry unit 16 and the interface 17 permits the action to be shifted to the static mode through operating the external entry unit 16. This allows the static mode to be selected for emergency call, for example, by the external entry unit 16 being operated without being notified by the others around.

Figure 5:
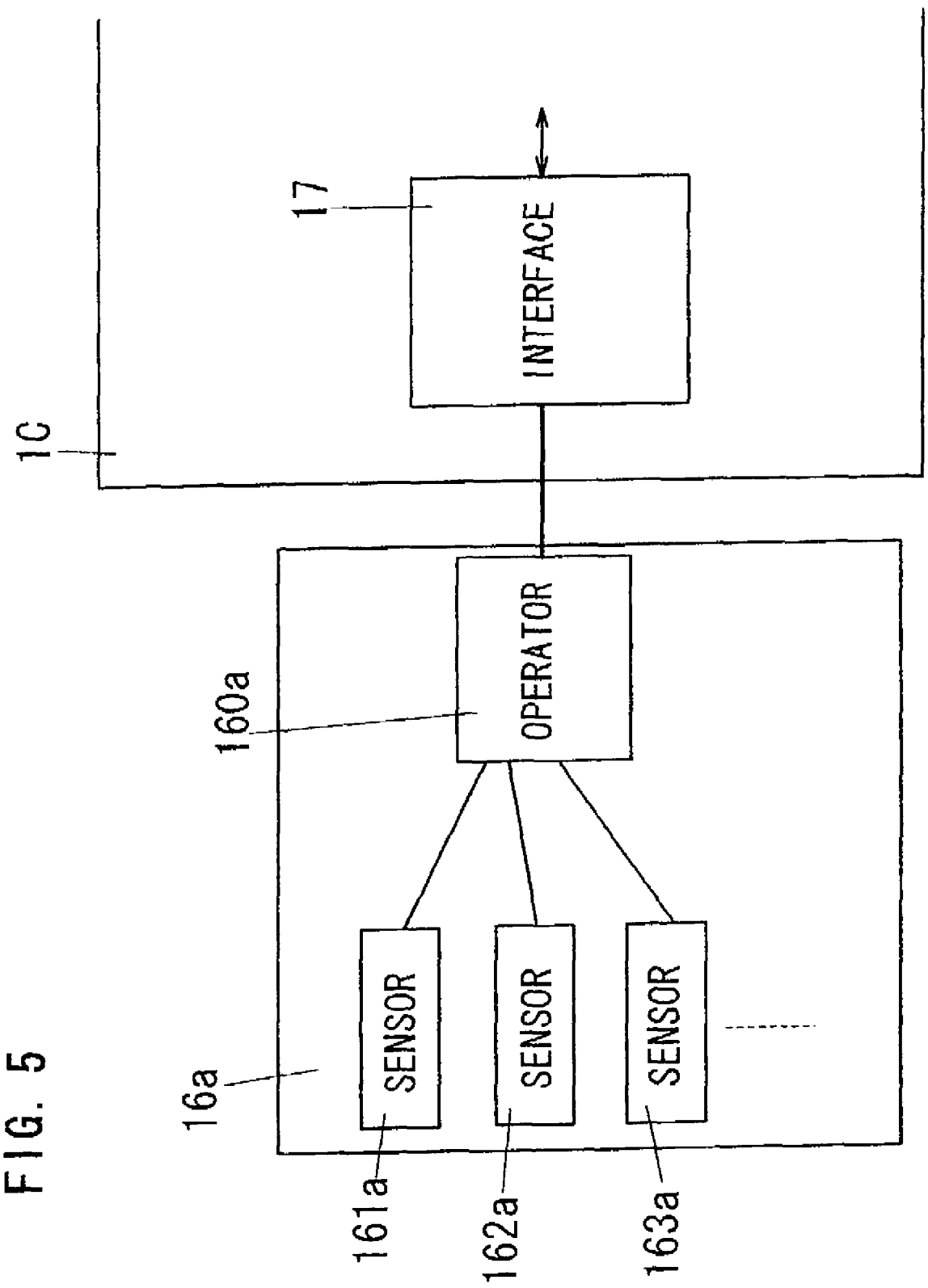
FIG. 5 is a schematic illustration of an external entry unit to be connected to the portable radio communication terminal.
Figure 6:
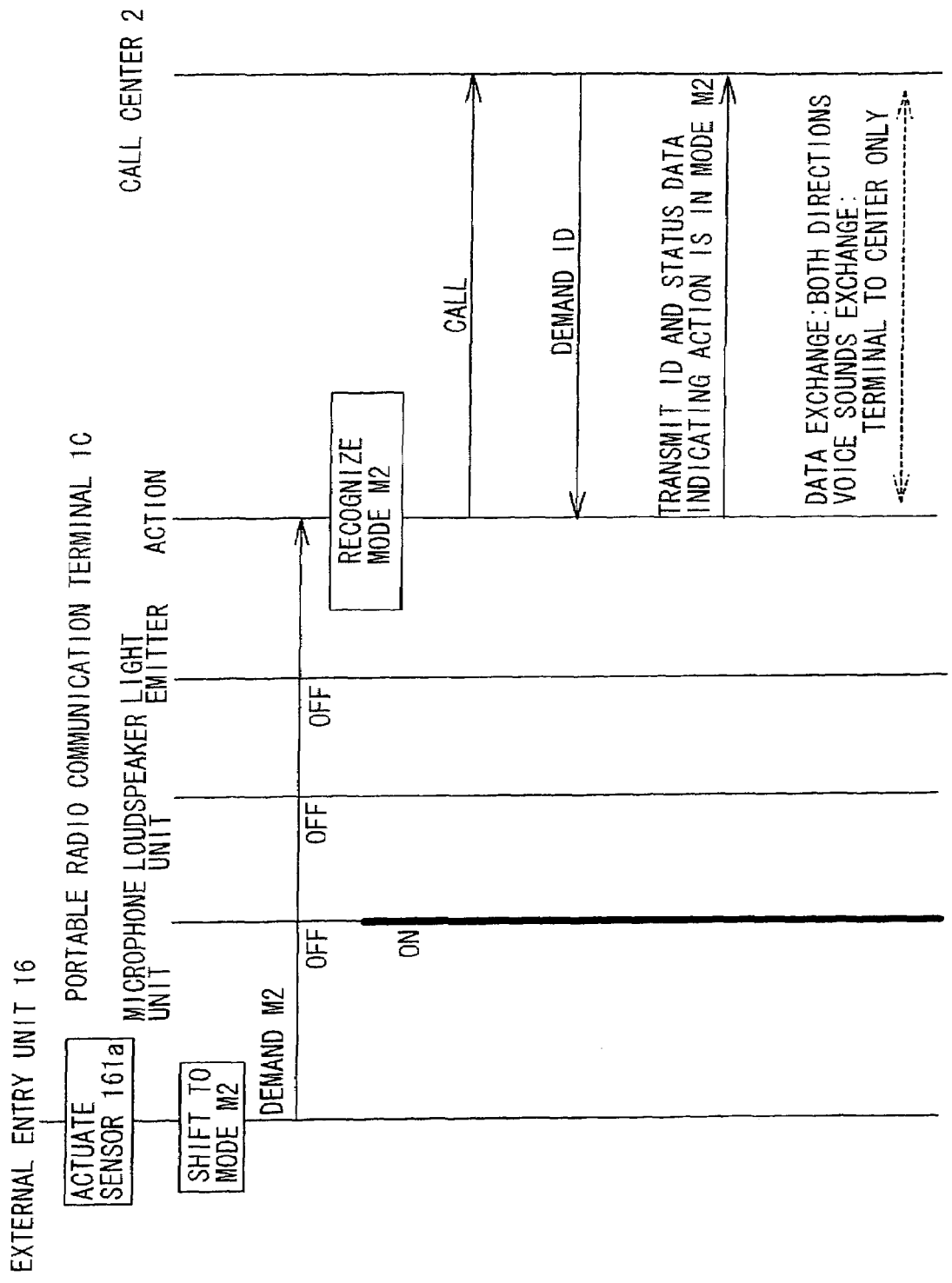
FIG. 6 is a diagram explaining the action of a static mode of the portable radio communication terminal.

The external entry unit 16 is not limited to the push-button switch arrangement of the fourth embodiment but may be replaced by an external entry unit 16a which comprises, as shown in FIG. 5, a number of different sensors 161a, 162a, 163a, . . . and an operator 160a arranged responsive to the output of each sensor or any combination of the sensors for producing a signal which is identical to that of the external entry unit 16. This arrangement allows the action to be shifted to the static mode, for example as shown in FIG. 6, when the sensor 161a is actuated and the operator 160a produces a signal which is equal to that produced by pressing the switch of the operating the external entry unit 16. Accordingly, the emergency call can be made in more secrecy without being notified by the others around than the third embodiment.

The external entry unit 16 and the interface 17 may be connected to each other by not only traditional wires but also any wireless system such as infrared ray data association (IrDA), BLUE TOOTH, or specific energy-saving radio system.

Fifth Embodiment

A fifth embodiment of the present invention includes the mode switches 151a and 151b of the fourth embodiment as shown in FIG. 4, which are identical to those of the second embodiment. In this embodiment, the mode switches 151a and 151b can provide the same effect as of the fourth embodiment.

Sixth Embodiment

Figure 7:
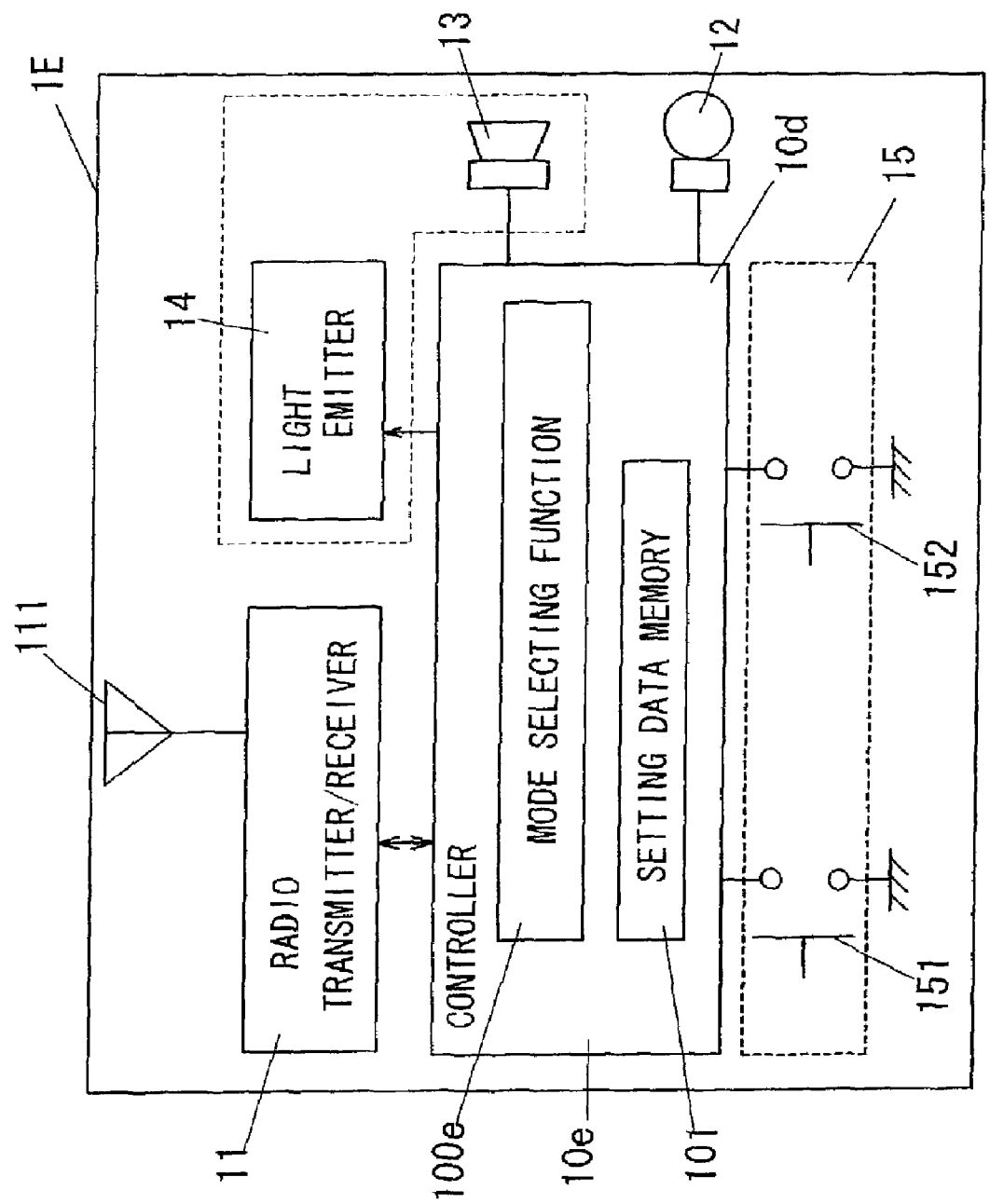
FIG. 7 is a schematic illustration of a portable radio communication terminal showing a sixth embodiment of the present invention.

FIG. 7 illustrates a sixth embodiment of the present invention.

A portable radio communication terminal 1E of the sixth embodiment is similar to that of the first embodiment, as shown in FIG. 7, comprising a radio transmitter/receiver 11, a microphone unit 12, a loudspeaker unit 13, a light emitter 14, and an operation entering unit 15. As is different from the first embodiment, the portable radio communication terminal 1E of this embodiment includes a controller 10e.

The controller 10e is substantially identical to the controller 10 of the first embodiment, except that the mode selecting function 100 is replaced by a further mode selecting function 100e and additionally a setting data memory 101 is provided.

The setting data memory 101 is a nonvolatile memory such as a RAM or an EEPROM for storage of the setting data.

The further mode selecting function 100e is designed for storing in its setting data memory 101 the setting data which has been received at the radio transmitter/receiver 11 from a predetermined call center for assigning a procedure of actions to the operation entering unit 15 to select between the normal mode and the static mode and for informing at least either the loudspeaker unit 13 or the light emitter 14 of setting of the procedure for selecting between the normal mode and the static mode. When the operation entering unit 15 is activated, it is examined from the setting data stored in the setting data memory 101 whether its operation is intended for selecting the normal mode or the static mode. It is designed that when the setting data stored on the setting data memory 101 is a data for the initial setting, the action equal to the mode selecting function 100 of the first embodiment takes place.

Figure 8:
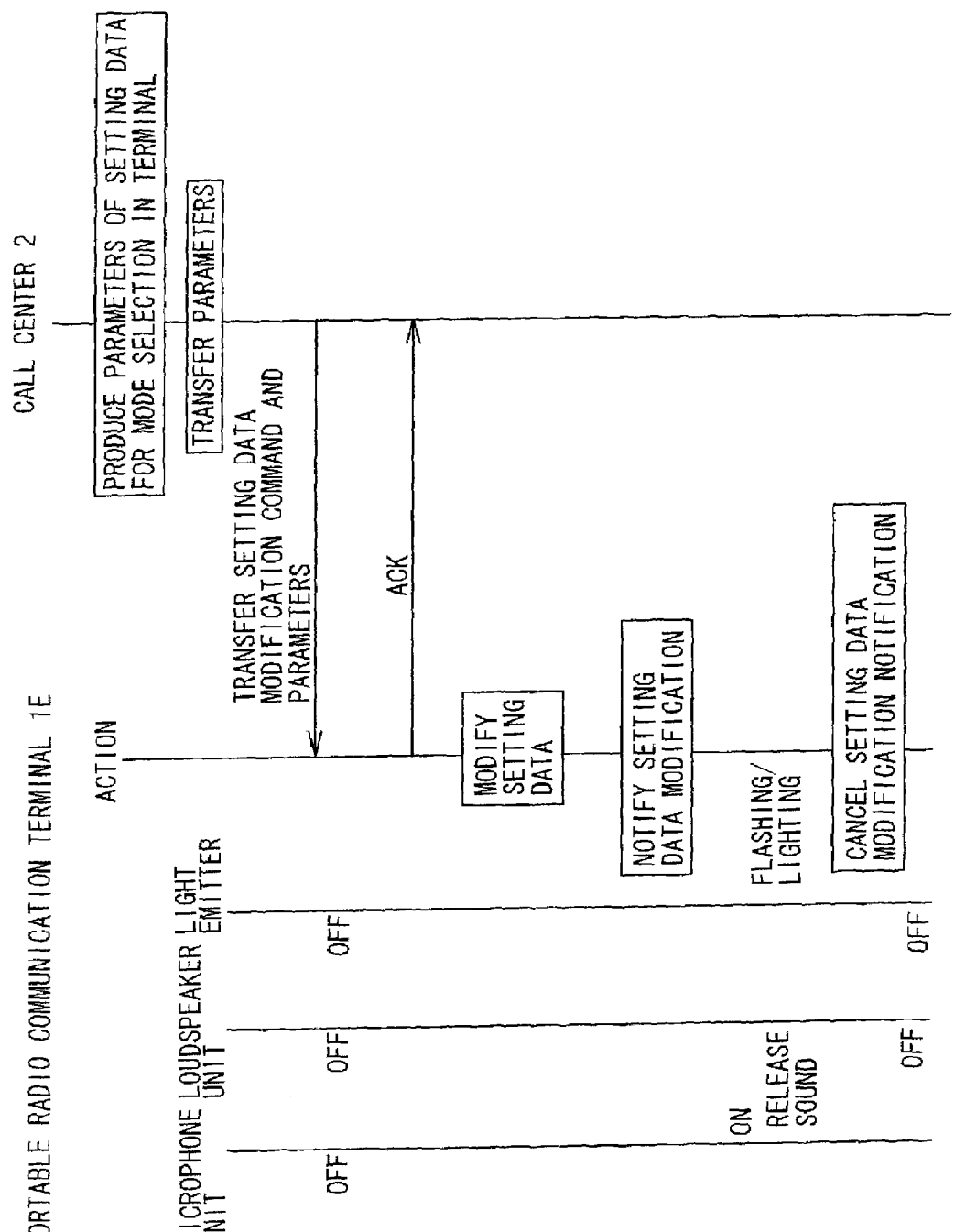
FIG. 8 is a diagram explaining the action for modifying the setting data on the portable radio communication terminal.

Another action of the portable radio communication terminal 1E which is not feasible with the first embodiment will be described. It is assumed, as shown in FIG. 8, that the call center 2 wants to modify the setting data of the portable radio communication terminal 1E during the communications between the portable radio communication terminal 1E and the call center 2 so that the static mode is selected only when the normal mode switch 151 and the static mode switch 152 are turned on at one time. The action starts with producing a modified form (a set of parameters) of the setting data which is then transferred to the portable radio communication terminal 1E.

Upon receiving the modified setting data, the portable radio communication terminal 1E produces a reply or ACK signal to the call center 2 indicating that the modified setting data has correctly been received and stores the modified setting data in its setting data memory 101. This procedure consumes a predetermined length of time (until the end of setting data modification is released) which can be set with a timer. The arrangement shown in FIG. 8 allows the setting data modification to be notified by the microphone unit 12 releasing a sound and the light emitter 14 emitting light (intermittently). The timer may be replaced by a switch (not shown) which is turned on by the user of the portable radio communication terminal 1E to cancel the notification of the setting data modification. The advantage of this embodiment is to notify the setting data modification on the operation entering unit without increasing the number of the relevant components.

Seventh Embodiment

Figure 9:
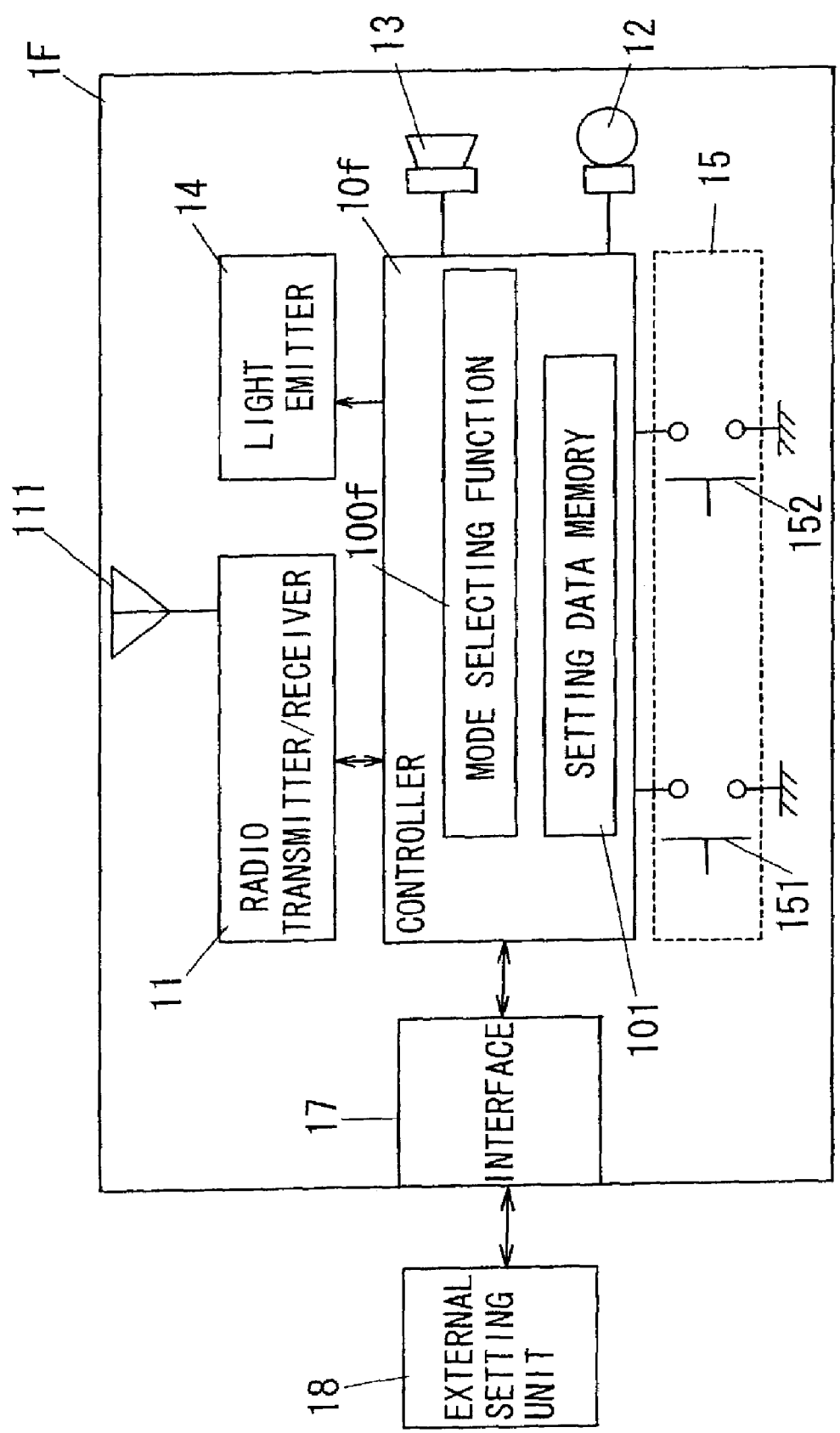
FIG. 9 is a schematic illustration of a portable radio communication terminal showing a seventh embodiment of the present invention.

FIG. 9 illustrates a seventh embodiment of the present invention.

A portable radio communication terminal 1F of the seventh embodiment is similar to that of the first embodiment, as shown in FIG. 9, comprising a radio transmitter/receiver 11, a microphone unit 12, a loudspeaker unit 13, a light emitter 14, and an operation entering unit 15. As is different from the first embodiment, the portable radio communication terminal 1F of this embodiment includes an external setting unit 18 which may be a personal computer or a dedicated device, an interface 17 for connection with the external setting unit 18, and a controller 10f.

The controller 10f is substantially identical to the controller 10 of the first embodiment, except that the mode selecting function 100 is replaced by a further mode selecting function 100f and additionally a setting data memory 101 is provided. The further mode selecting function 100f is designed for storing in its setting data memory 101 the setting data which has been received via the interface 17 from the external setting unit 18 for assigning a procedure of actions to the operation entering unit 15 to select between the normal mode and the static mode and for examining whether the action of the operation entering unit 15 when activated is intended for selecting the normal mode or the static mode and then carrying out a controlling action for the selected mode.

This embodiment allows the external setting unit 18 to be connected with the interface 17 and used for modifying the setting data (of parameters) stored in the setting data memory 101 of the portable radio communication terminal 1F. Accordingly, the portable radio communication terminal 1F can favorably be customized for matching with the user.

Eighth Embodiment

Figure 10:
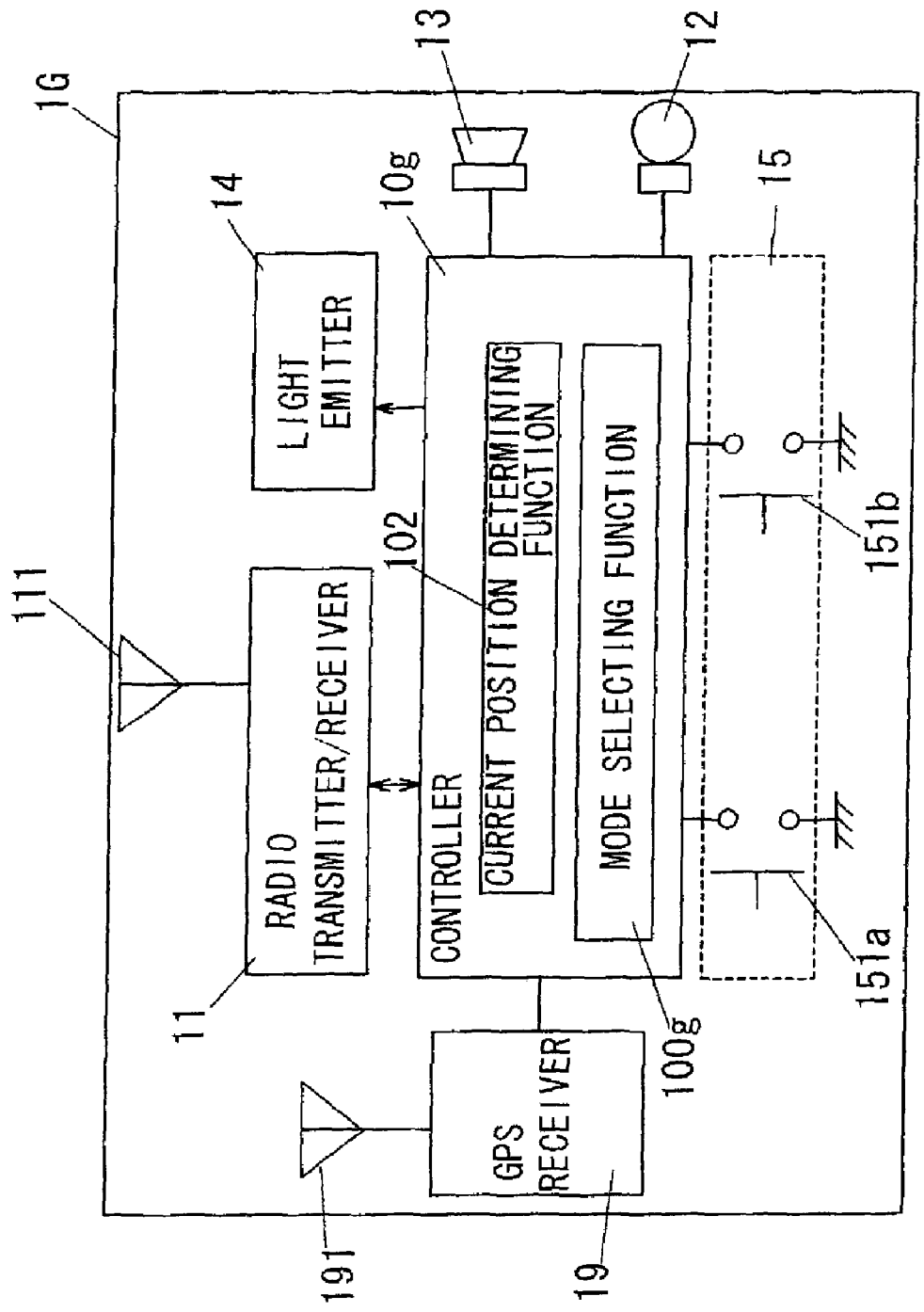
FIG. 10 is a schematic illustration of a portable radio communication terminal showing an eighth embodiment of the present invention.

FIG. 10 illustrates an eighth embodiment of the present invention.

A portable radio communication terminal 1G of the eighth embodiment is similar to that of the second embodiment, as shown in FIG. 10, comprising a radio transmitter/receiver 11, a microphone unit 12, a loudspeaker unit 13, a light emitter 14, and an operation entering unit 15. As is different from the second embodiment, the portable radio communication terminal 1G of this embodiment includes a GPS receiver 19 equipped with an antenna 191 for receiving a GPS signal and a controller 10g.

The controller 10g is substantially identical to the controller 10a of the second embodiment, except that the mode selecting function 100a is replaced by a further mode selecting function 100g and additionally a current position determining function 102 is provided.

The current position determining function 102 is featured for calculating the current position from a GPS signal received by the GPS receiver 19. As is different from the mode selecting function 100a of the second embodiment, the further mode selecting function 100g is designed for transferring in the static mode a data of the current position calculated by the current position determining function 102 via the radio transmitter/receiver 11 to a predetermined emergency call center.

Figure 11:
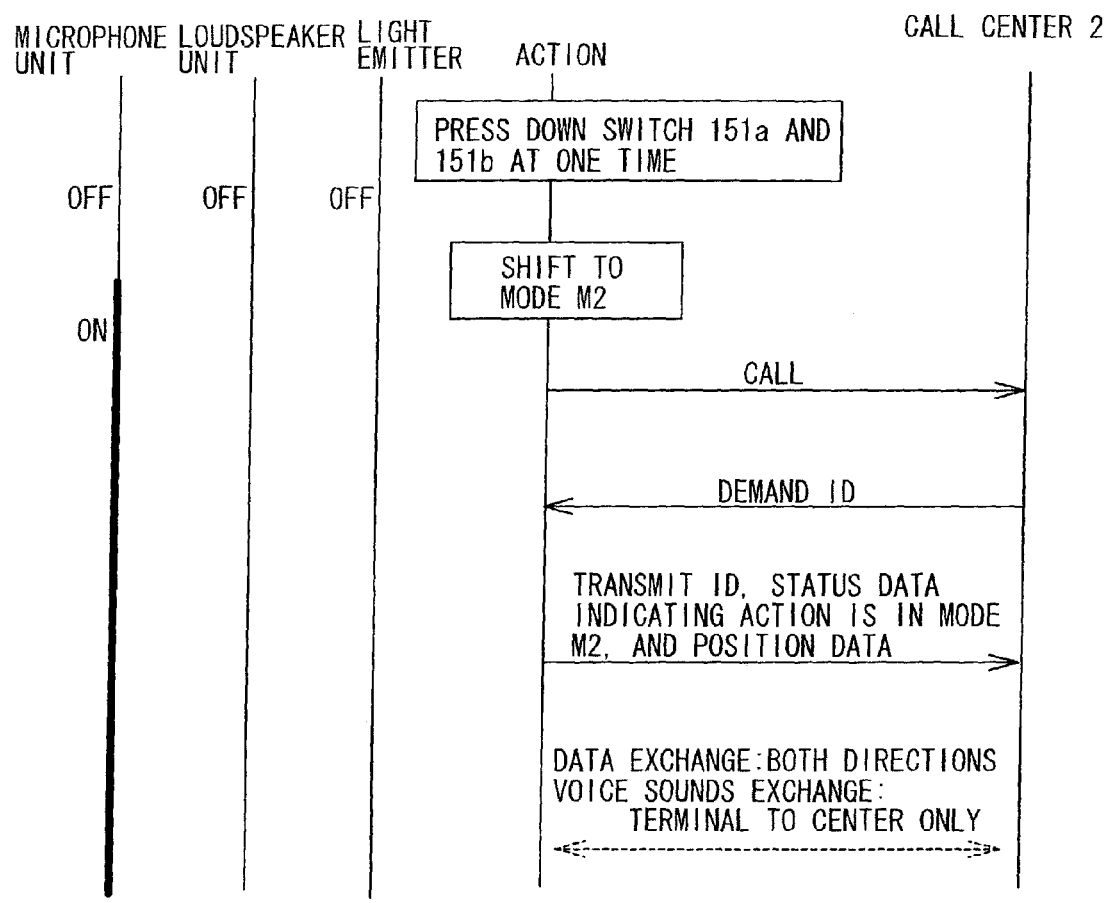
FIG. 11 is a diagram explaining the action of a static mode of the portable radio communication terminal.

Another action of the portable radio communication terminal 1G of this embodiment which is not feasible with the second embodiment will be described. When the normal mode switches 151a and 151b are pressed down at one time as shown in FIG. 11, the action shifts to the static mode M2 where the microphone unit 12 remains turned on while the loudspeaker unit 13 and the light emitter 14 are turned off and the access via the radio transmitter/receiver 11 to the call center 2 is connected. Simultaneously, the current position determining function 102 calculates the current position from a GPS signal received by the GPS receiver 19.

Then, upon being demanded from the call center 2 for receiving an ID, the portable ratio communication terminal 1G transmits its ID, a status data indicating that the action is in the static mode M2, and a data of the current position calculated by the current position determining function 102 via the radio transmitter/receiver 11 to the call center 2. As the call center 2 accepts the ID, the communication between the portable radio communication terminal 1G and the call center 2 can be started for exchange of data and voice sounds.

As described, the data of the current position of the portable radio communication terminal 1G is received along with the voice sound by the call center 2 which can thus carry out an appropriate action such as calling to a police station.

Ninth Embodiment

A ninth embodiment of the present invention includes a mode selecting function, of which operation is different from the mode selecting function 100g of the eighth embodiment as shown in FIG. 10.

The mode selecting function 100g is designed for providing a call center with a data of the current position determined by its current position determining function 102 when the radio transmitter/receiver 11 has received a request command from the call center.

Figure 12:
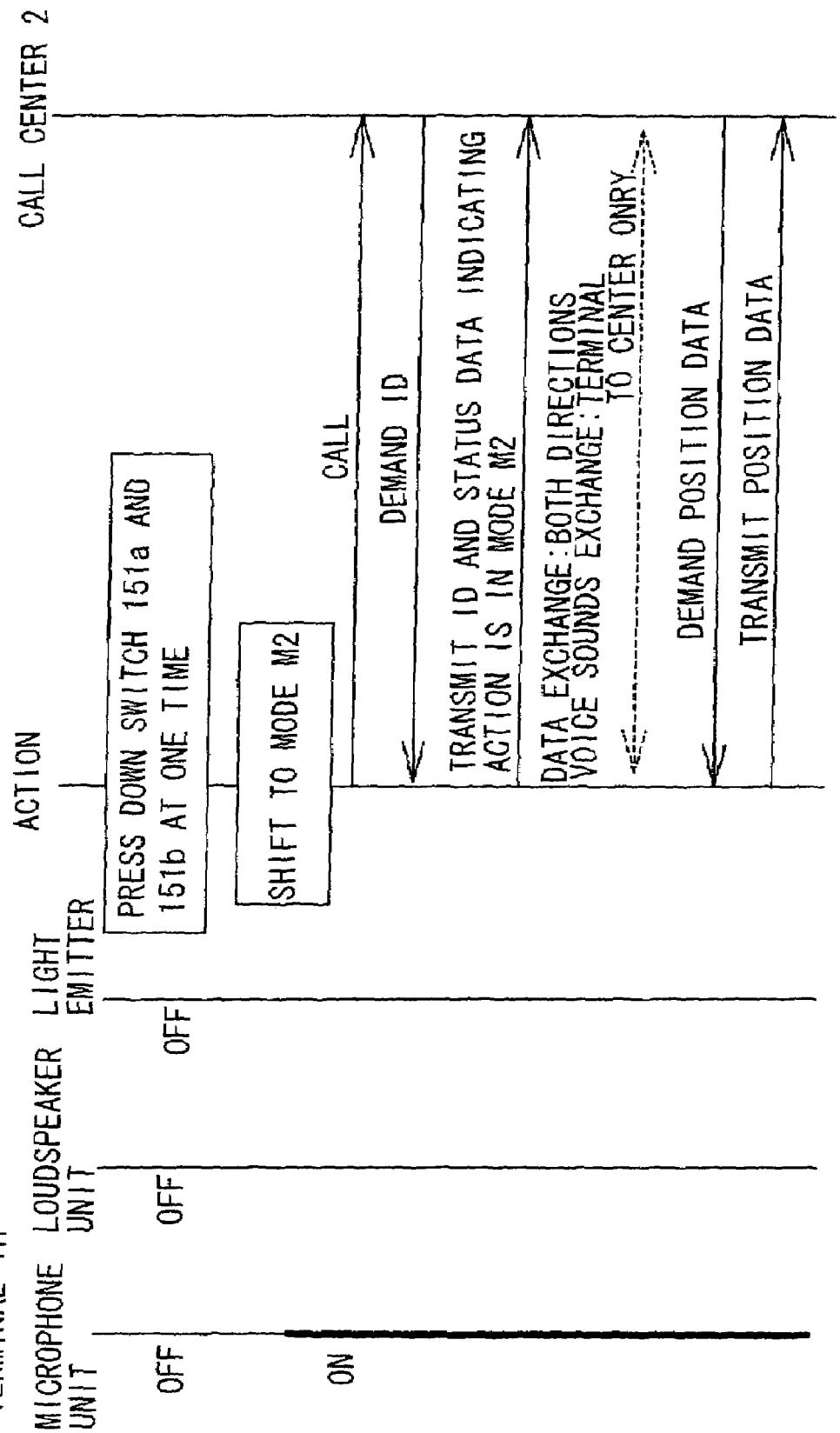
FIG. 12 is a diagram explaining the action of a static mode of the portable radio communication terminal.

The action of the portable radio communication terminal 1G will be explained in more detail. When the two normal mode switches 151a and 151b are pressed down at one time, as shown in FIG. 12, the action shifts to the static mode M2 where the microphone unit 12 remains turned on while the loudspeaker unit 13 and the light emitter 14 are turned off and the access via the radio transmitter/receiver 11 to the call center 2 is connected. Upon being demanded from the call center 2 for receiving an ID, the portable radio communication terminal 1H provides the call center 2 with its assigned ID and a status data which indicates that the action is in the static mode M2. As the call center 2 accepts the ID, the communications between the portable radio communication terminal 1G and the call center 2 are permitted for exchange of data and voice sounds.

When receiving at the radio transmitter/receiver 11 from the call center 2 a command for optionally requesting a data of the current position, the portable radio communication terminal 1H calculates the current position from a GPS signal received by the GPS receiver 19 and transmits the data of its current position to the call center 2.

The advantage of this embodiment is equal to that of the eighth embodiment.

Tenth Embodiment

FIGS. 13 to 20 illustrate a tenth embodiment of the present invention.

Figure 13:
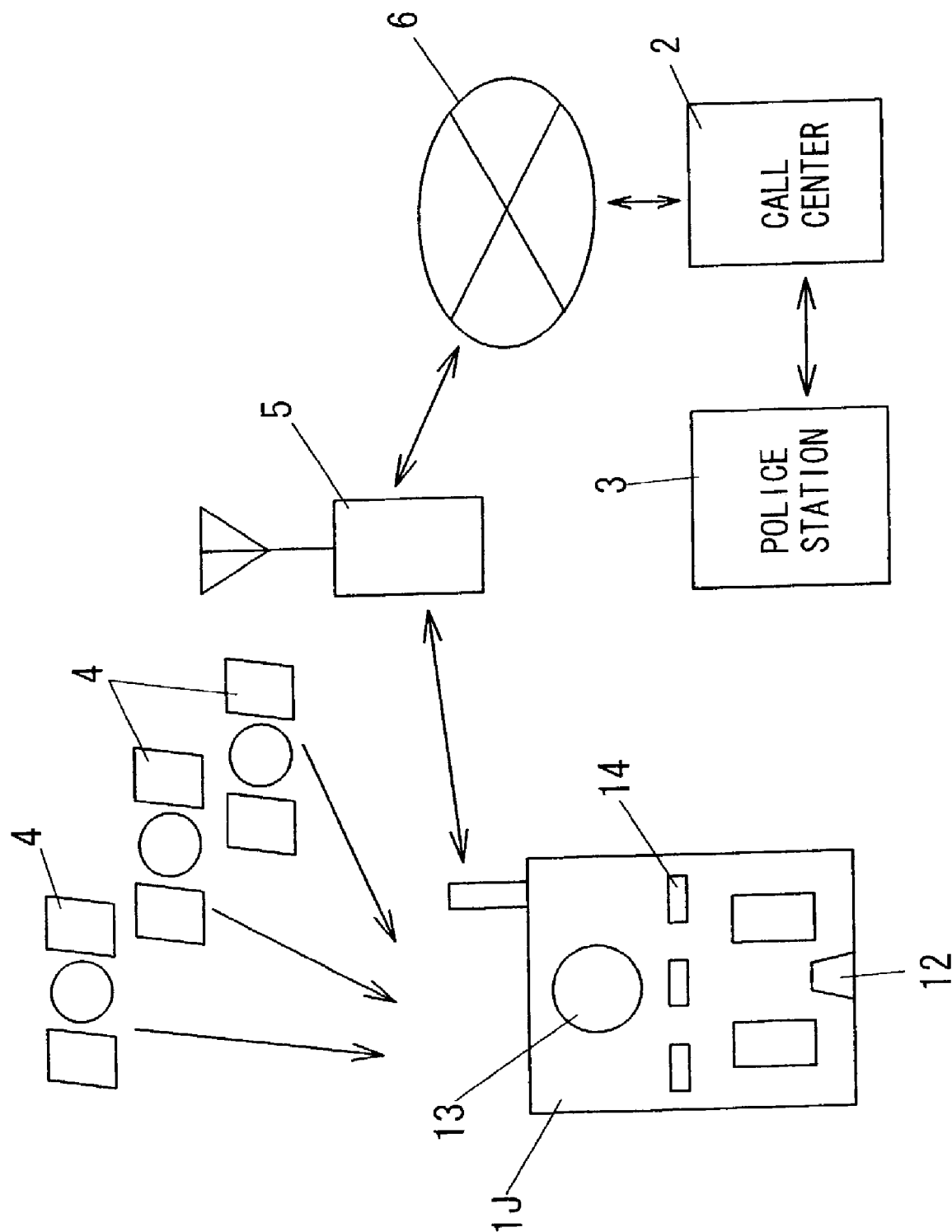
FIG. 13 is a schematic illustration of a system with a portable radio communication terminal showing a tenth embodiment of the present invention.

The system of the tenth embodiment comprises, as shown in FIG. 13, a portable radio communication terminal 1J, a call center 2, a police station 3, a group of GPS satellites 4, a radio public communications line base station 5, and a public communications network 6.

Figure 14:
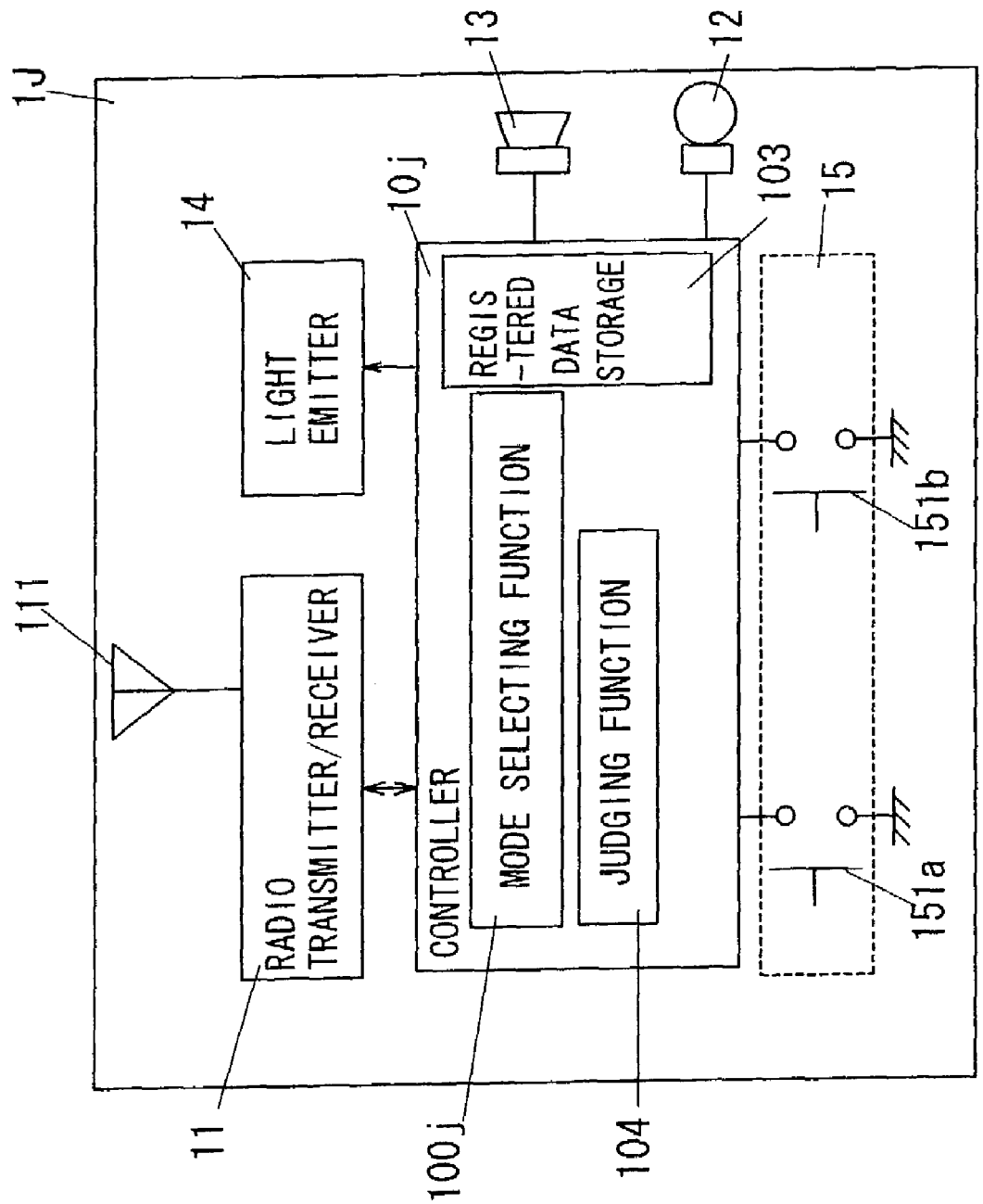
FIG. 14 is a schematic illustration of the portable radio communication terminal in the system.

The portable radio communication terminal 1J in the system is substantially similar to that of the second embodiment, as shown in FIG. 14, comprising a radio transmitter/receiver 11, a microphone unit 12, a loudspeaker unit 13, a light emitter 14, and an operation entering unit 15. As is different from the second embodiment, the portable radio communication terminal 1J of this embodiment includes a controller 10j for operating in any of three, first, second, and third, judging modes.

The controller 10j is substantially identical to the controller 10a of the second embodiment, except that the mode selecting function 100a is replaced by a further mode selecting function 100j and additionally a registered data storage 103 and a judging function 104 are provided.

Figure 15:
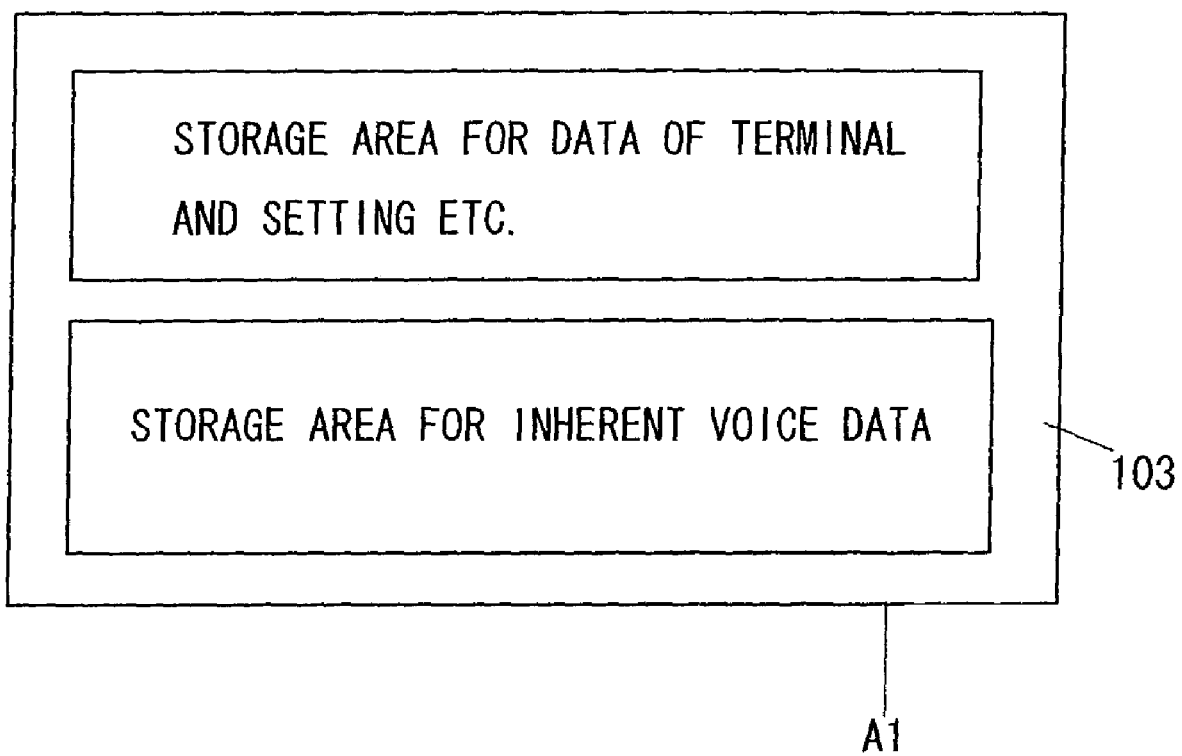
FIG. 15 is a diagram showing a first judging mode in the portable radio communication terminal.
Figure 17:
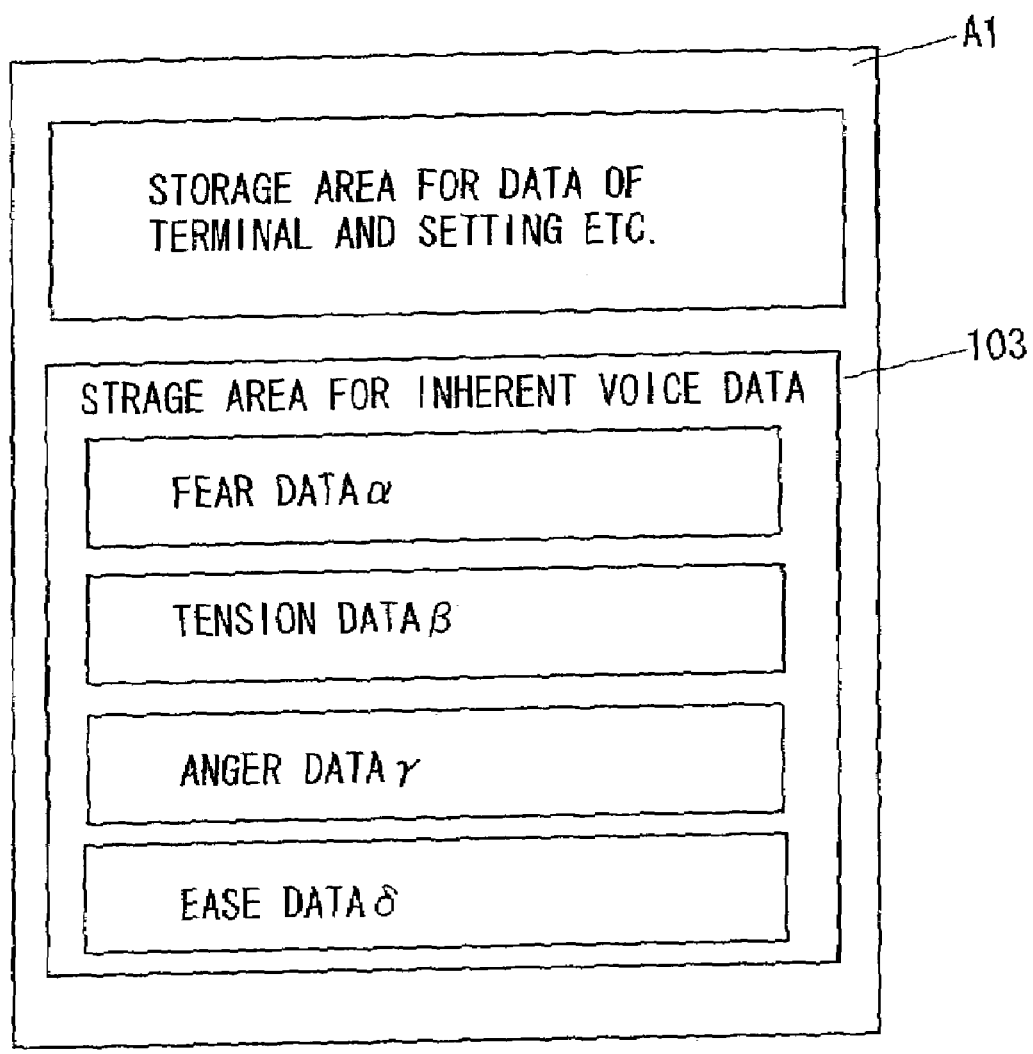
FIG. 17 is a diagram showing a second judging mode in the portable radio communication terminal.
Figure 19:
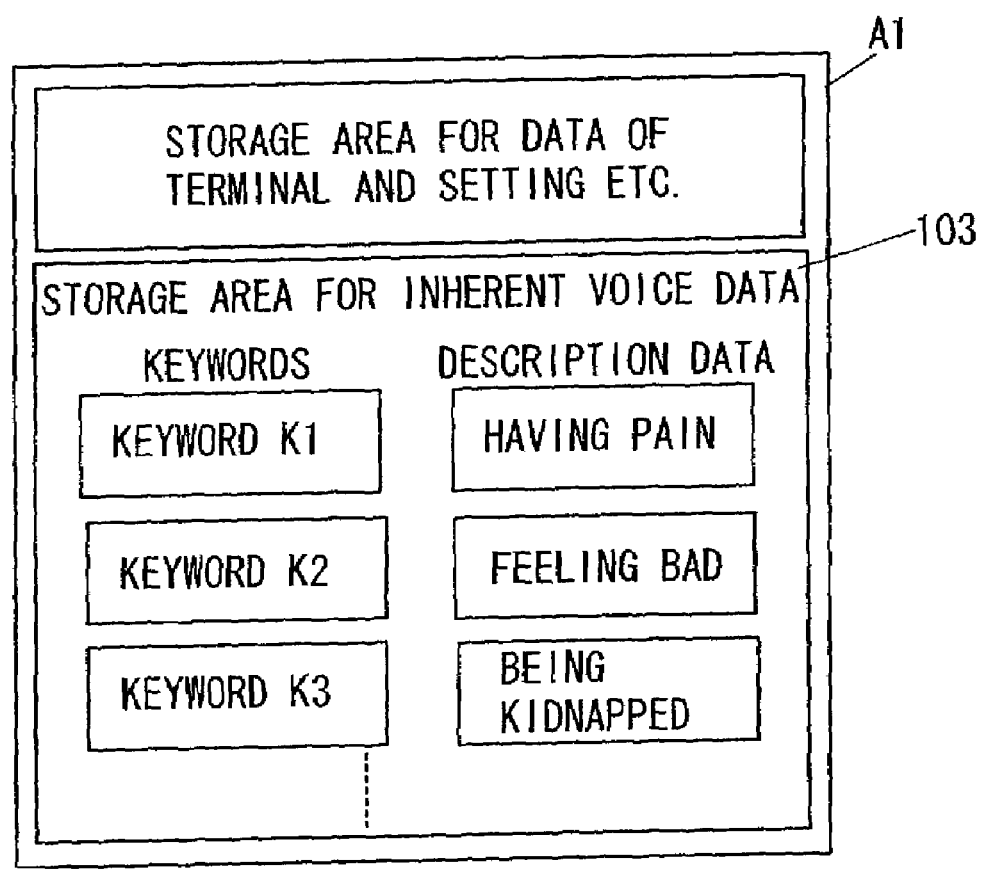
FIG. 19 is a diagram showing a third judging mode in the portable radio communication terminal.

The registered data storage 103 may be a nonvolatile memory A1 such as an EEPROM for storage of a variety of registered data. In the first judging mode, the inherent voice data of a user assigned to the portable radio communication terminal 1J is saved in the memory A1 of the registered data storage 103 as shown in FIG. 15. In the second judging mode, the frequency band and the waveform of a psychological voice data of the user when having a fear (a fear data $\alpha$), the frequency band and the waveform of a psychological voice data of the user when having a tension (a tension data $\beta$), the frequency band and the waveform of a psychological voice data of the user when having an anger (an anger data $\gamma$), and the frequency band and the waveform of a psychological voice data of the user when having an ease (an ease data $\delta$) are saved in the memory A1 of the registered data storage 103 as shown in FIG. 17. In the third judging mode, the voice data of keywords (K1, K2, K3, . . . ) of the user and their description data (representing having a pain, feeling bad, being kidnapped, etc.) are saved in the memory A1 of the registered data storage 103 as shown in FIG. 19.

The judging function 104 is featured for operating differently between the first to third judging modes. In the first judging mode, it is judged whether or not a voice signal received from the microphone unit 12 is equal to the inherent voice data of the user stored in the registered data storage 103. In the second judging mode, it is judged whether or not a voice signal received from the microphone unit 12 is matched with the frequency band and the waveform of any psychological voice data which represents a mental status of the user. In the third judging mode, it is judged whether or not a voice signal received from the microphone unit 12 includes the voice data related to any keyword stored in the registered data storage 103.

The mode selecting function 100j is featured for carrying out different actions in the first to third judging modes in addition to the action of the mode selecting function 100a of the second embodiment. When the static mode is selected in its first judging mode, the judging function 104 examines the presence of the user and transmits its information to the call center 2. When the static mode is selected in its second judging mode, the judging function 104 examines the psychological status of the user and transmits its information to the call center 2. When the static mode is selected in its third judging mode, the judging function 104 examines the presence of a keyword related voice data in the voice signal, reads out its keyword description from the registered data storage 103, and transmits it to the call center 2. The call center 2 is adapted in the tenth embodiment for automatically releasing an emergency call to the police station upon receiving a signal of the user presentation, the psychological information, or the keyword description from the mode selecting function 100j in the static mode.

Figure 16:
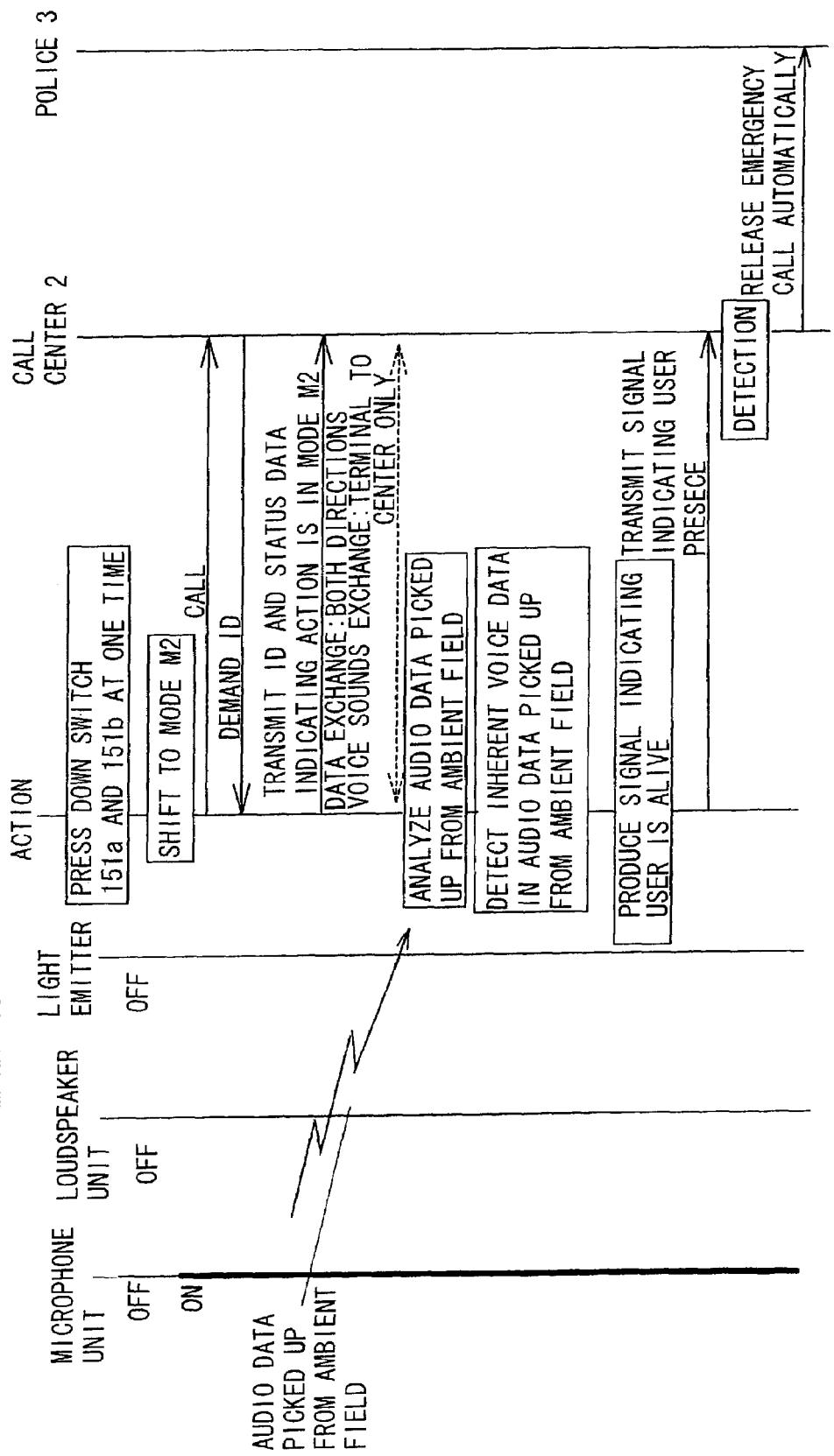
FIG. 16 is a diagram showing an action of the first judging mode in the portable radio communication terminal.

The actions in the first to third judging modes will be explained in more detail. When the two normal mode switches 151a and 151b are pressed down at one time in the first judging mode as shown in FIG. 16, the action shifts to the static mode M2 where the microphone unit 12 remains turned on while the loudspeaker unit 13 and the light emitter 14 are turned off and the access via the radio transmitter/receiver 11 to the call center 2 is connected. Upon being demanded from the call center 2 for receiving an ID, the portable radio communication terminal 1J provides the call center 2 with its assigned ID and a status data which indicates that the action is in the static mode M2. As the call center 2 accepts the ID, the communications between the portable radio communication terminal 1J and the call center 2 are permitted for exchange of data and voice sounds.

This is followed by judging whether or not a voice signal received from the microphone unit 12 is equal to the inherent voice data of the user stored in the registered data storage 103. More specifically, the judgment is conduced by a known voice recognition process where it is examined whether or not an audio data (picked up from the ambient field and) received from the microphone unit 12 includes the inherent voice data of the user stored in the registered data storage 103. When it is judged that the user assigned to the portable radio communication terminal 1J is present, its information is transmitted to the call center 2. Upon receiving a signal of the user presentation, the call center 2 automatically releases an emergency call to the police station.

Figure 18:
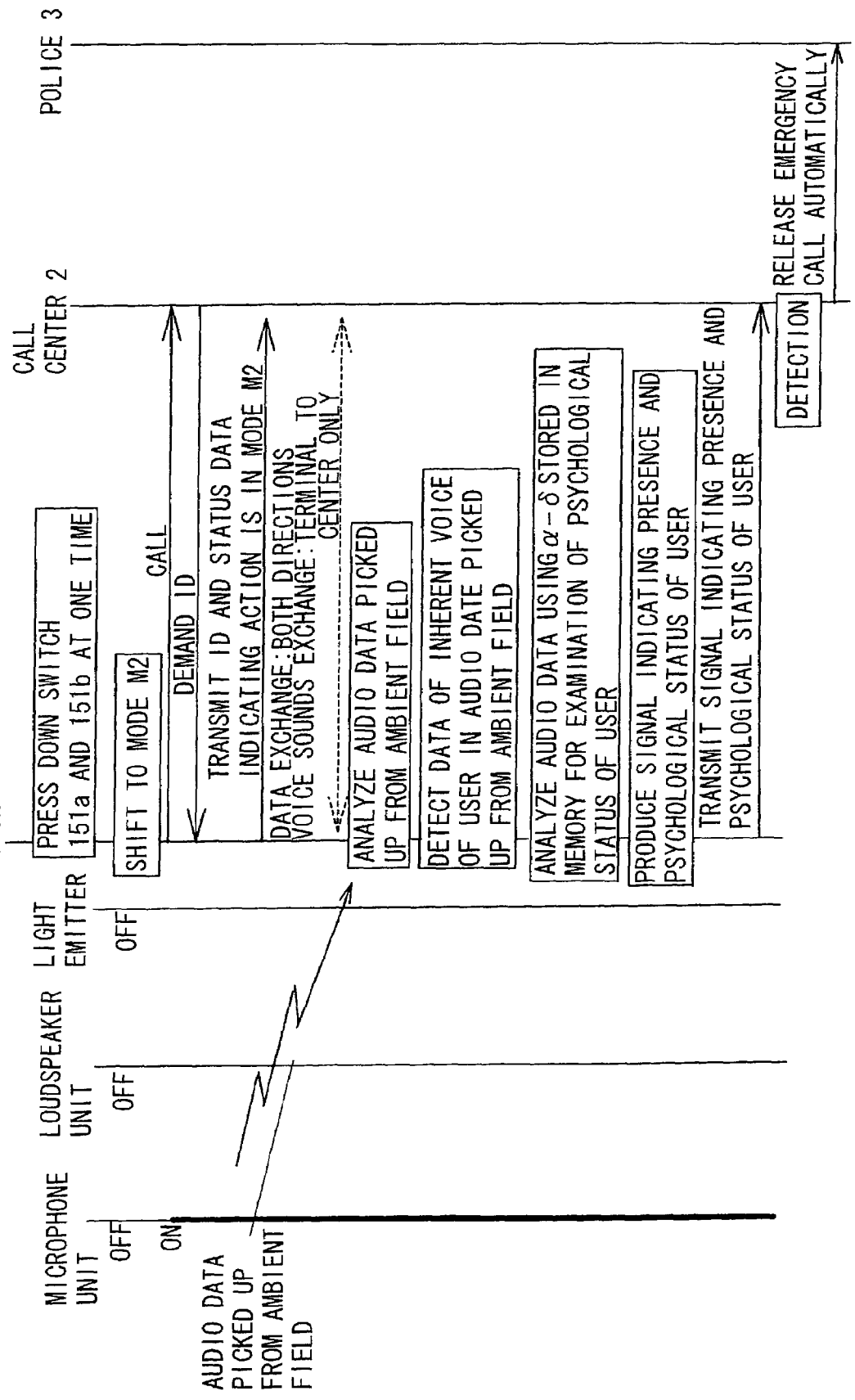
FIG. 18 is a diagram showing an action of the second judging mode in the portable radio communication terminal.

When the two normal mode switches 151a and 151b are pressed down at one time in the second judging mode as shown in FIG. 18, the action shifts to the static mode M2 where the microphone unit 12 remains turned on while the loudspeaker unit 13 and the light emitter 14 are turned off and the access via the radio transmitter/receiver 11 to the call center 2 is connected. Upon being demanded from the call center 2 for receiving an ID, the portable radio communication terminal 1J provides the call center 2 with its assigned ID and a status data which indicates that the action is in the static mode M2. As the call center 2 accepts the ID, the communications between the portable radio communication terminal 1J and the call center 2 are permitted for exchange of data and voice sounds.

This is followed by judging whether or not a voice signal received from the microphone unit 12 indicates one of the different psychological voice data of the user stored in the registered data storage 103. More specifically, the judgment is made by a known voice recognizing and analyzing process where it is examined with the use of reference data such as window data or mask data whether or not an audio data (picked up from the ambient field and) received from the microphone unit 12 includes the fear data α, the tension data β, the anger data γ, the ease data δ, or their combination of the user stored in the registered data storage 103. For example, when the voice signal substantially includes the fear data α, it is analyzed that the user is alive but exhibiting its enormous fear. The judging function 104 then produces and transmits a signal indicating the presence and the psychological status of the user to the call center 2. Upon receiving the signal, the call center 2 automatically releases an emergency call to the police station.

Figure 20:
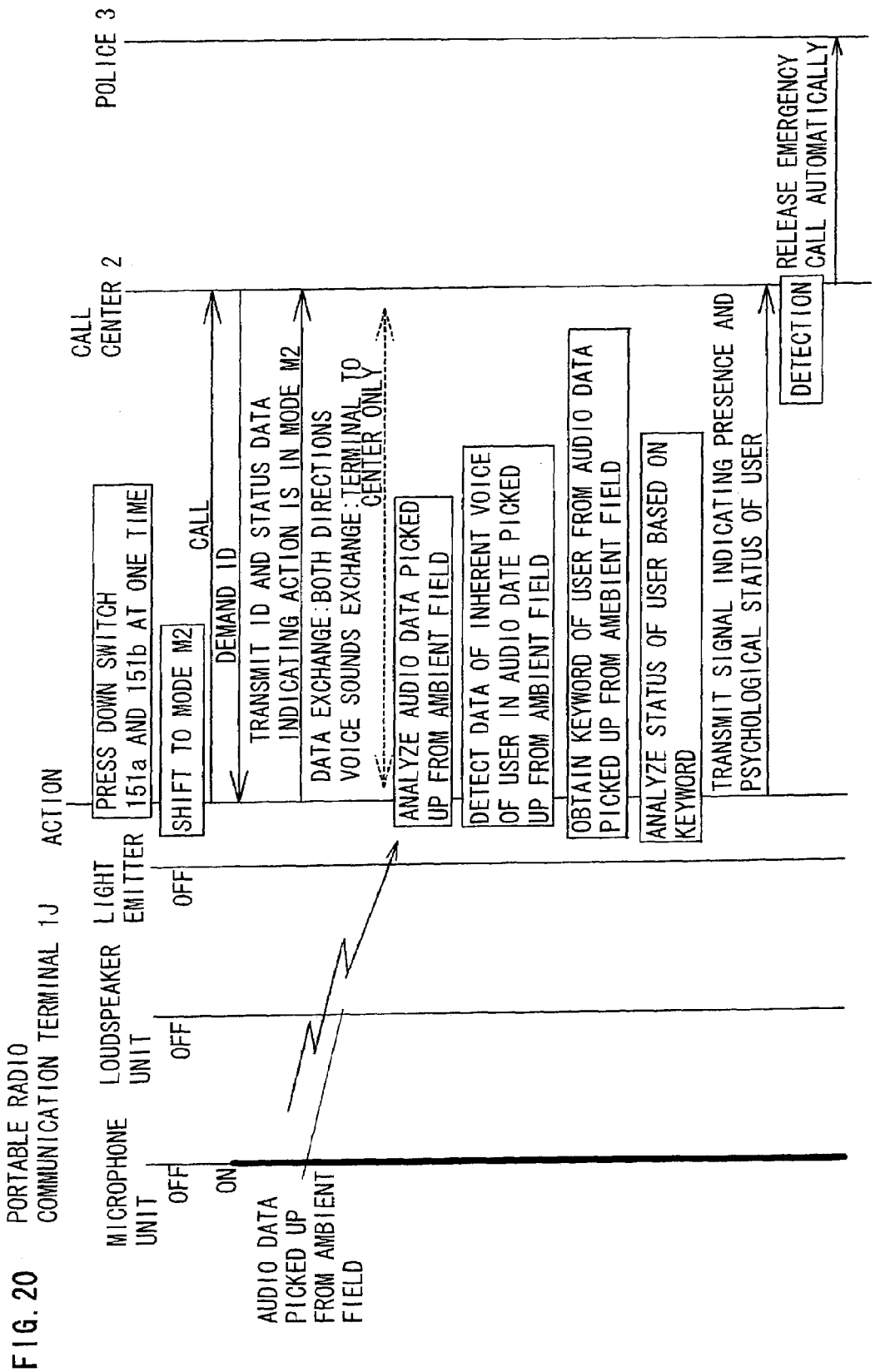
FIG. 20 is a diagram showing an action of the third judging mode in the portable radio communication terminal.

When the two normal mode switches 151a and 151b are pressed down at one time in the third judging mode as shown in FIG. 20, the action shifts to the static mode M2 where the microphone unit 12 remains turned on while the loudspeaker unit 13 and the light emitter 14 are turned off and the access via the radio transmitter/receiver 11 to the call center 2 is connected. Upon being demanded from the call center 2 for receiving an ID, the portable radio communication terminal 1J provides the call center 2 with its assigned ID and a status data which indicates that the action is in the static mode M2. As the call center 2 accepts the ID, the communications between the portable radio communication terminal 1J and the call center 2 are permitted for exchange of data and voice sounds.

This is followed by judging whether or not a voice signal received from the microphone unit 12 includes any characteristic voice data of the user stored in the registered data storage 103. More specifically, the judgment is conducted by a known voice recognition process where it is examined whether or not an audio data (picked up from the ambient field and) received from the microphone unit 12 includes any keyword related voice data of the user stored in the registered data storage 103. For example, when the voice signal includes the voice data related to the keyword K1, it is judged that the user is alive but in a physical status defined by the keyword K1. The description data of the keyword K1 is read out from the registered data storage 103 and transferred to the call center 2. The description data of the keyword K1 indicates that the user is calling with its pain. Upon receiving the keyword description data, the call center 2 automatically releases an emergency call to the police station.

As described, this embodiment allows more details of the current status of the user to be obtained and automatically transmitted thus encouraging to make an appropriate counter action. Also, the emergency call from the user can systematically be transferred to the police station even if the call center holds no operator. The second judging mode permits the psychological voice data of the user to be transmitted for ease of the understanding of a mental status. The third judging mode explains the current physical status of the user which can thus be understood with ease.

Eleventh Embodiment

FIGS. 21 to 27 illustrate an eleventh embodiment of the present invention.

Figure 21:
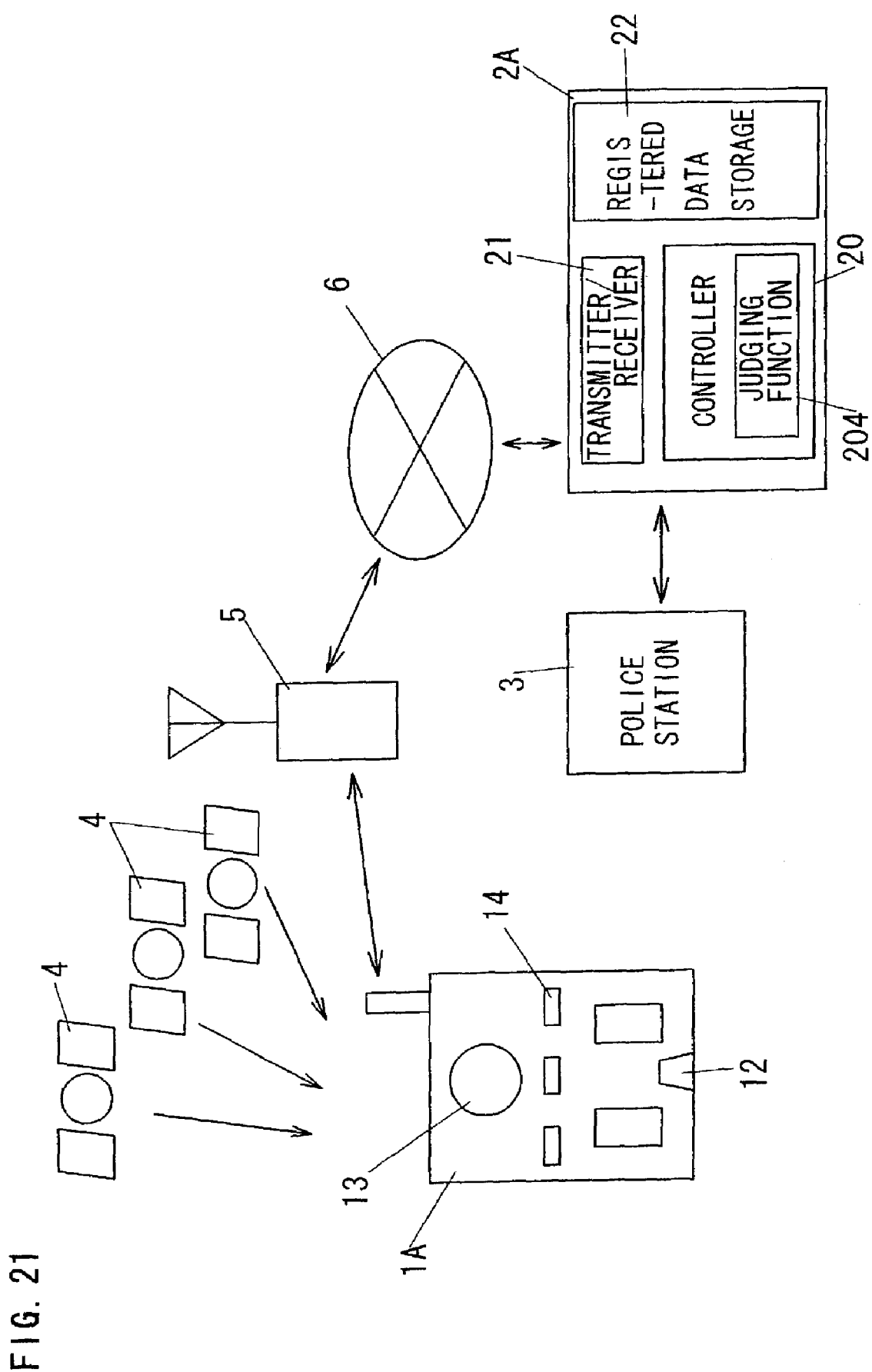
FIG. 21 is a schematic illustration of a system with a portable radio communication terminal showing an eleventh embodiment of the present invention.

The system of the eleventh embodiment comprises, as shown in FIG. 21, a portable radio communication terminal 1A which is identical to that of the second embodiment, a call center 2A, a police station 3, a group of GPS satellites 4, a radio public communications line base station 5, and a public communications network 6.

The call center (apparatus) 2A comprises a transmitter/receiver 21 for transmitting and receiving signals over the public communications network 6, a registered data storage 22, and a controller 20 as is designed for operating in three, first, second, and third, judging modes.

Figure 22:
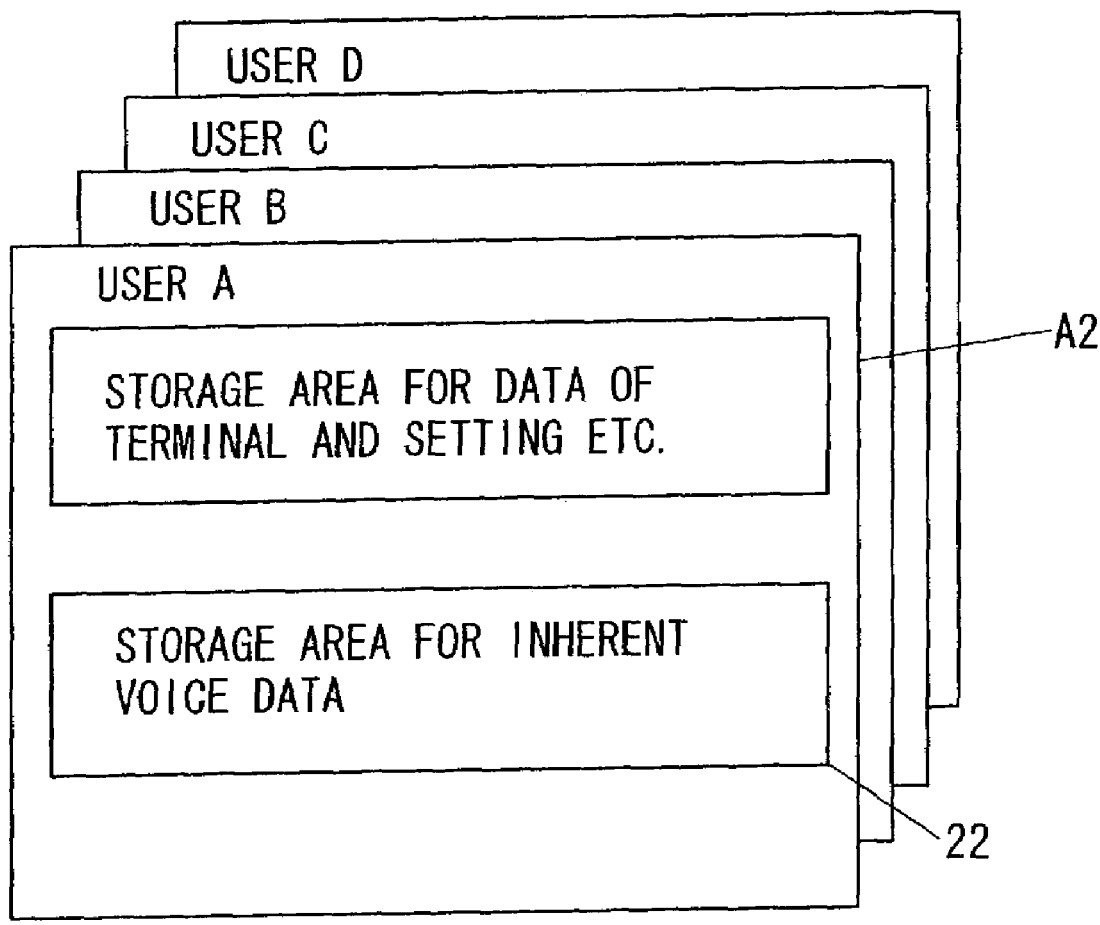
FIG. 22 is a diagram showing a first judging mode in the system.
Figure 24:
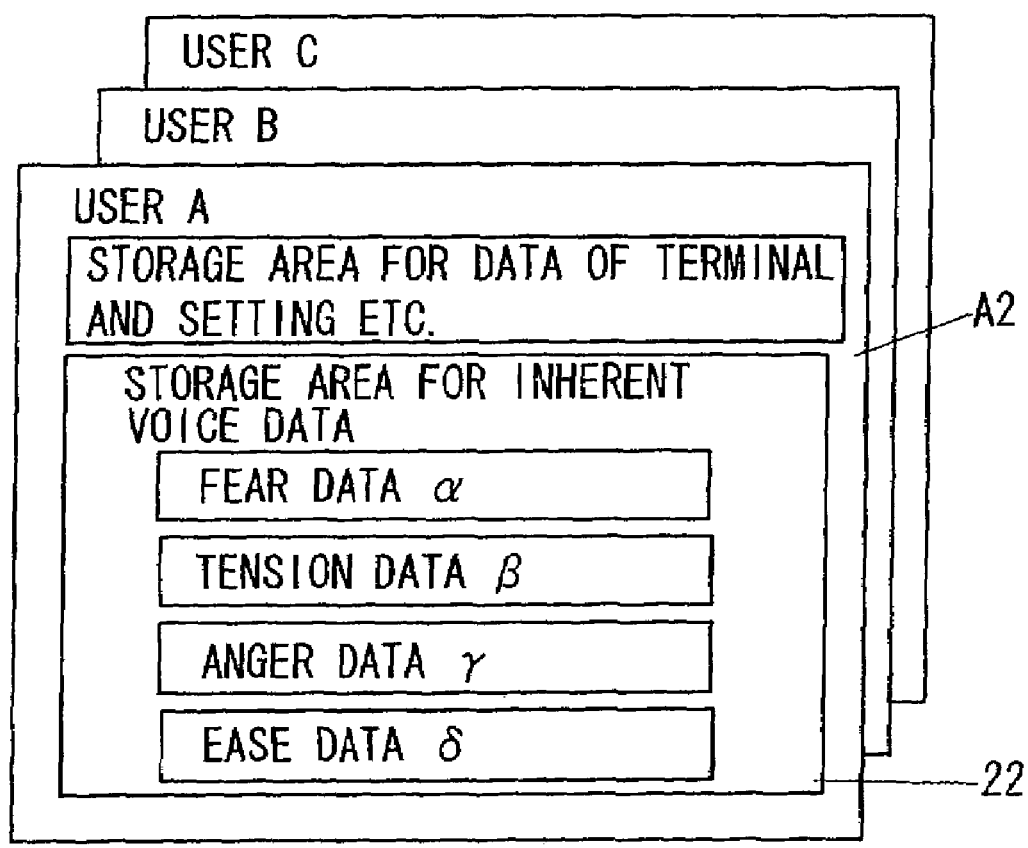
FIG. 24 is a diagram showing a second judging mode in the system.
Figure 26:
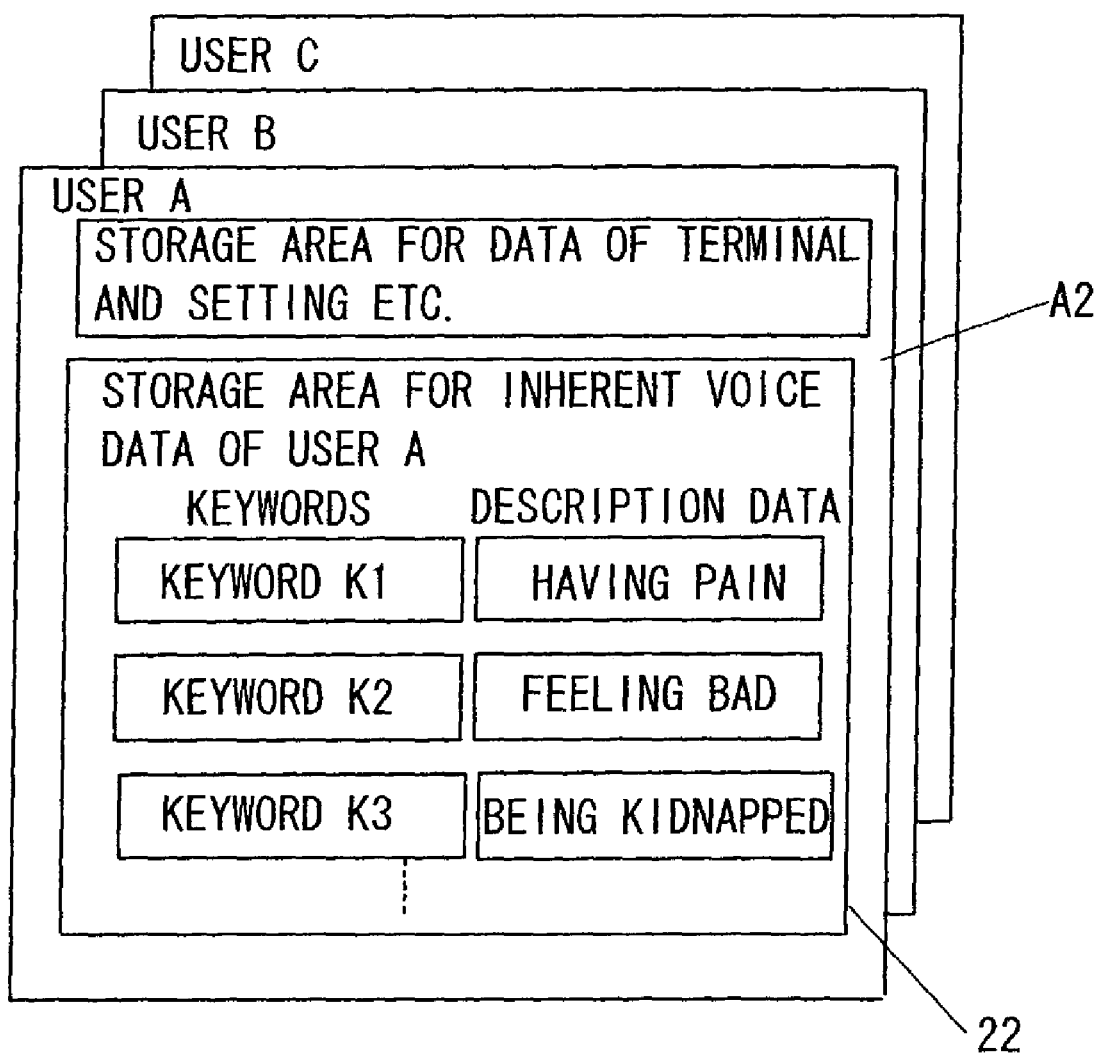
FIG. 26 is a diagram showing a third judging mode in the system.

The registered data storage 22 may be a nonvolatile memory A2 such as an EEPROM for storage of a variety of registered data. In the first judging mode, the inherent voice data of a user assigned to the portable radio communication terminal 1A is saved in the memory A2 of the registered data storage 22 as shown in FIG. 22. In the second judging mode, the frequency band and the waveform of a psychological voice data of the user when having a fear (a fear data α), the frequency band and the waveform of a psychological voice data of the user when having a tension (a tension data β), the frequency band and the waveform of a psychological voice data of the user when having an anger (an anger data γ), and the frequency band and the waveform of a psychological voice data of the user when having an ease (an ease data δ) are saved in the memory A2 of the registered data storage 22 as shown in FIG. 24. In the third judging mode, the voice data of keywords (K1, K2, K3, . . . ) of the user and their description data (representing having a pain, feeling bad, being kidnapped, etc.) are saved in the memory A2 of the registered data storage 22 as shown in FIG. 26.

The controller 20 may consist mainly of a CPU, a RAM, and a ROM for controlling the entire action of the call center 2A and particularly includes a judging function 204.

The judging function 204 is featured for operating differently between the first to third judging modes. In the first judging mode, it is judged whether or not a voice signal received from the portable radio communication terminal 1A is equal to the inherent voice data of the user stored in the registered data storage 22. In the second judging mode, it is judged whether or not a voice signal received from the portable radio communication terminal 1A is matched with the frequency band and the waveform of any psychological voice data which represents a mental status of the user as is stored in the registered data storage 22. In the third judging mode, it is judged whether or not a voice signal received from the portable radio communication terminal 1A includes the characteristic voice data of any keyword stored in the registered data storage 22.

The controller 20 is adapted for automatically releasing an emergency call to the police station upon receiving a signal of the user presentation, the psychological information, or the keyword description determined by the judging function 204 in the static mode.

Figure 23:
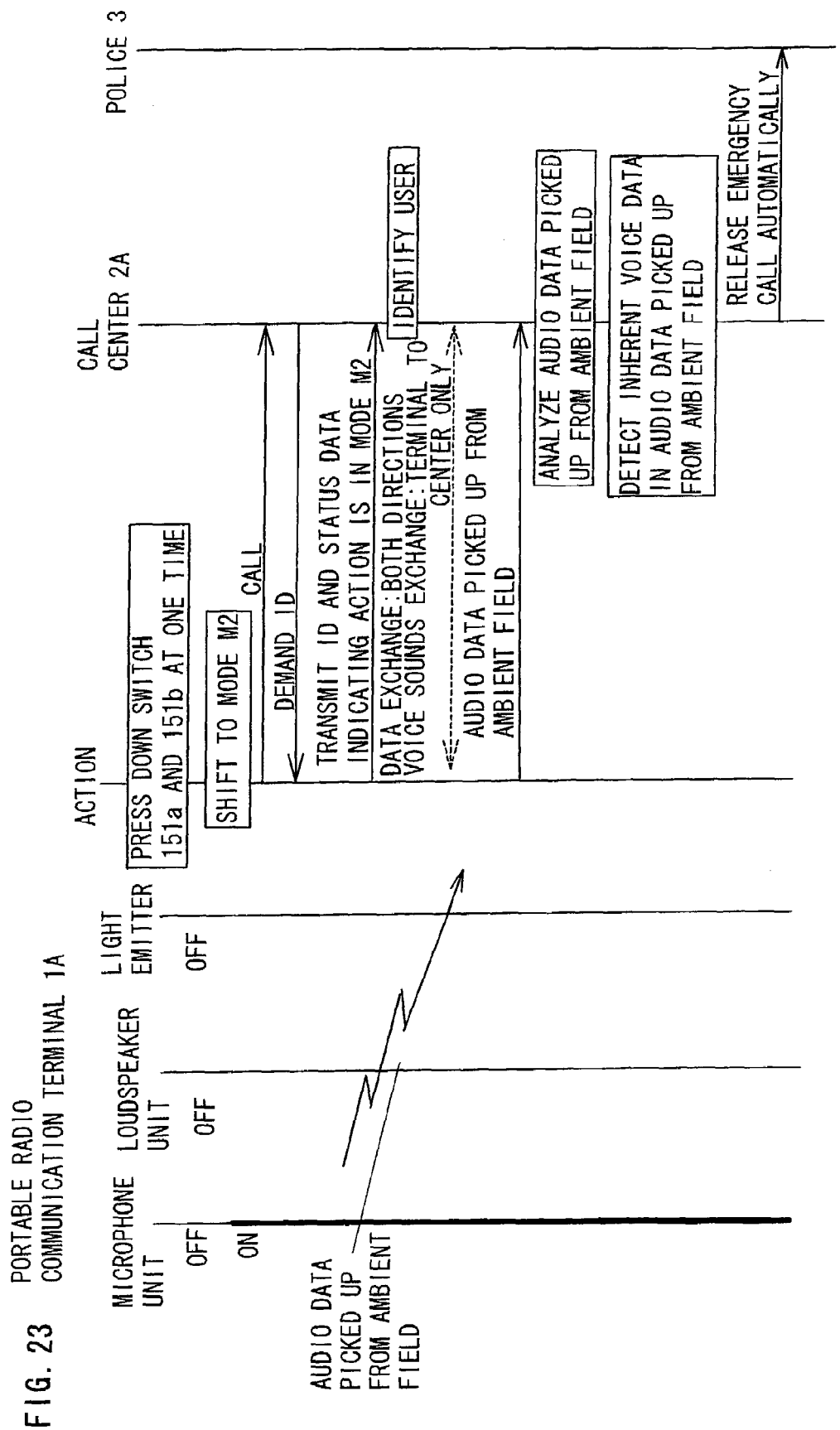
FIG. 23 is a diagram showing an action of the first judging mode in the system.

The actions in the first to third judging modes will be explained in more detail. When the two normal mode switches 151a and 151b are pressed down at one time in the first judging mode as shown in FIG. 23, the action shifts to the static mode M2 where the microphone unit 12 remains turned on while the loudspeaker unit 13 and the light emitter 14 are turned off and the access via the radio transmitter/receiver 11 to the call center 2A is connected. Upon being demanded from the call center 2A for receiving an ID, the ID assigned to the portable radio communication terminal 1A is transmitted from the radio transmitter/receiver 11 to the call center 2A together with a status data which indicates that the action is in the static mode M2. As the call center 2A accepts the ID, the communications between the portable radio communication terminal 1A and the call center 2A are permitted for exchange of data and voice sounds.

This is followed by judging whether or not a voice signal received from the portable radio communication terminal 1A is equal to the inherent voice data of the user stored in the registered data storage 22. More specifically, the judgment is conducted by a known voice recognition process where it is examined whether or not an audio data (picked up from the ambient field and) received from the portable radio communication terminal 1A includes the inherent voice data of the user stored in the registered data storage 22. When it is judged that the user assigned to the portable radio communication terminal 1A is present, an emergency call is automatically produced and transmitted to the police station. Alternatively, a data for the presentation of the user may be transferred to the police station.

Figure 25:
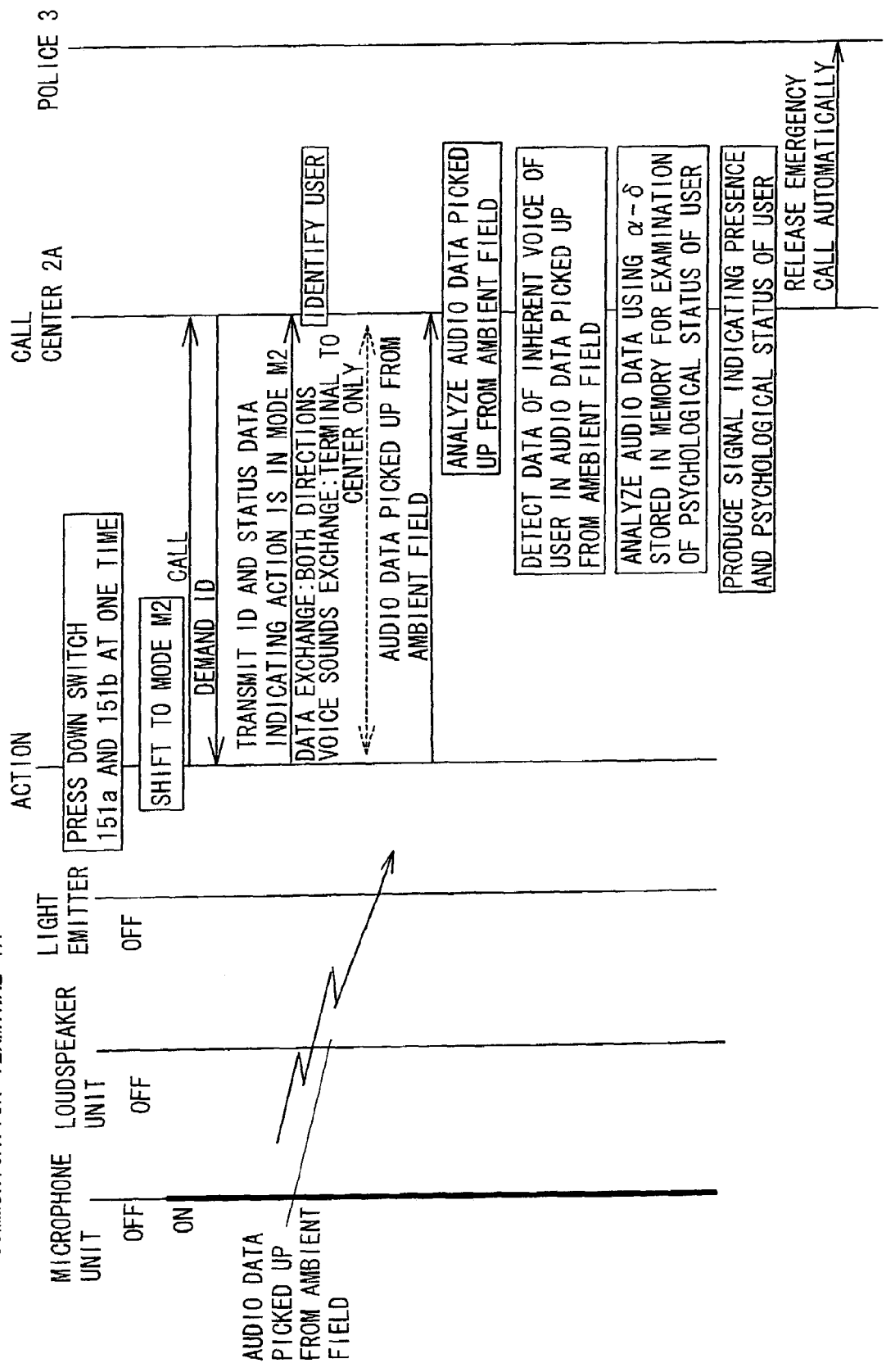
FIG. 25 is a diagram showing an action of the second judging mode in the system.

When the two normal mode switches 151a and 151b are pressed down at one time in the second judging mode as shown in FIG. 25, the action shifts to the static mode M2 where the microphone unit 12 remains turned on while the loudspeaker unit 13 and the light emitter 14 are turned off and the access via the radio transmitter/receiver 11 to the call center 2A is connected. Upon being demanded from the call center 2A for receiving an ID, the ID assigned to the portable radio communication terminal 1A is transmitted to the call center 2A together with a status data which indicates that the action is in the static mode M2. As the call center 2A accepts the ID, the communications between the portable radio communication terminal 1A and the call center 2A are permitted for exchange of data and voice sounds.

This is followed by judging whether or not a voice signal received from the portable radio communication terminal 1A indicates one of the different psychological voice data of the user stored in the registered data storage 22. More specifically, the judgment is made by a known voice recognizing and analyzing process where it is examined whether or not an audio data (picked up from the ambient field and) received from the portable radio communication terminal 1A includes the fear data α, the tension data β, the anger data γ, the ease data δ, or their combination of the user stored in the registered data storage 22. For example, when the voice data of a user A is substantially similar to the fear data a of the user A, it is analyzed that the user A is alive but exhibiting its enormous fear. Then, a data indicating the presence and the psychological status of the user A is produced and saved in the registered data storage 22 and an emergency call to the police station is automatically released. Alternatively, the police station may directly be provided with the data indicating the presence and the psychological status of the user A.

Figure 27:
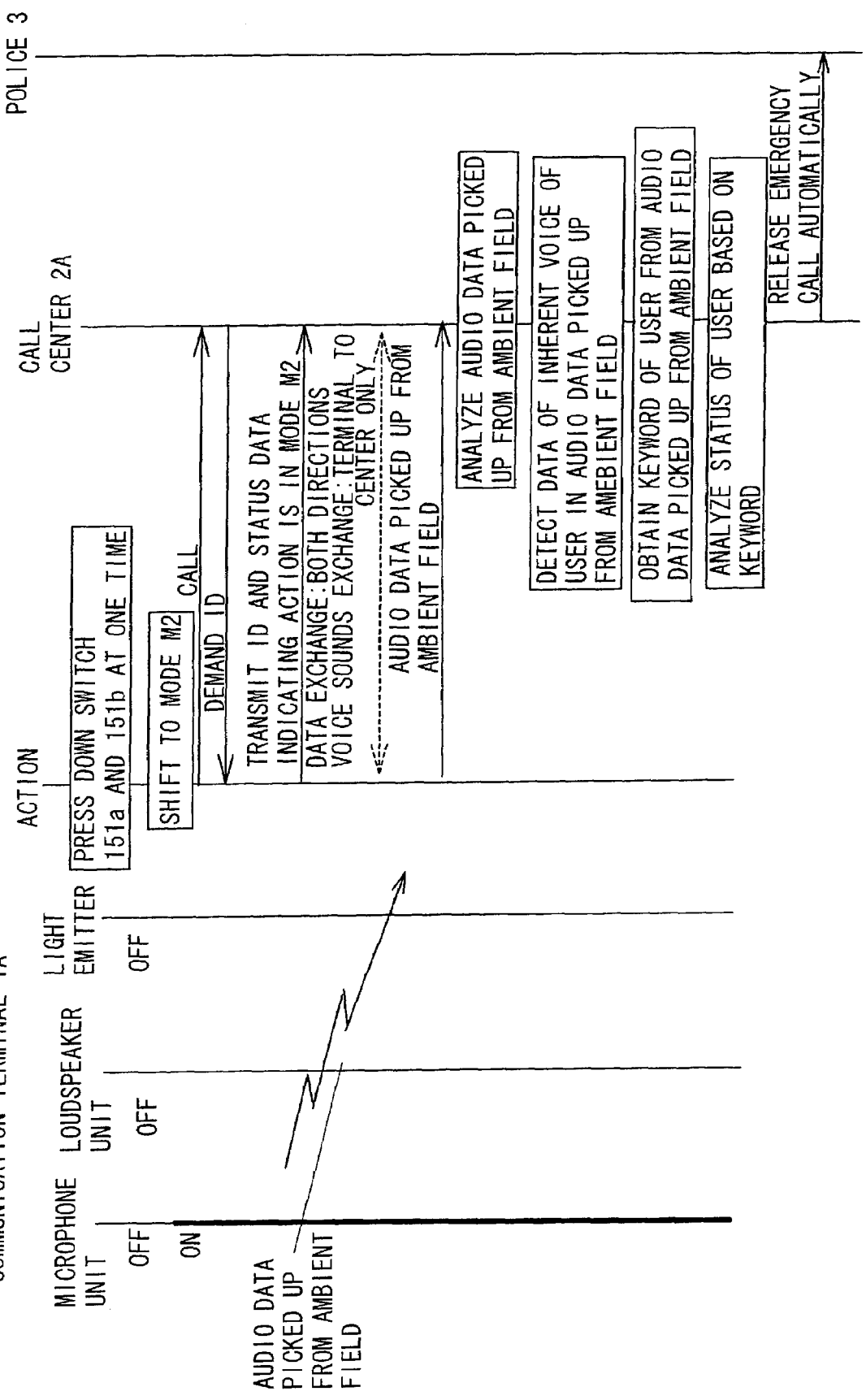
FIG. 27 is a diagram showing an action of the third judging mode in the system.
Figure 28:
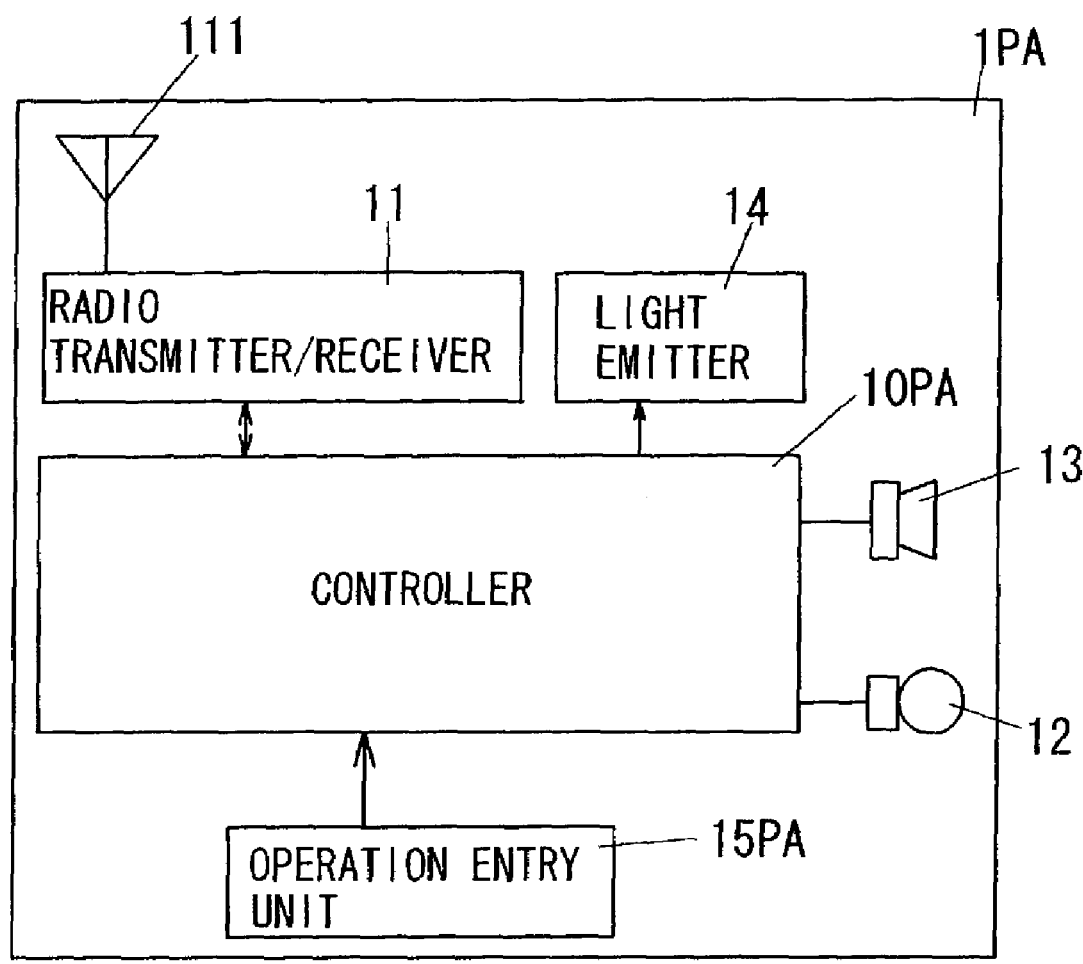
FIG. 28 is a schematic illustration of a conventional portable radio communication terminal.
Figure 29:
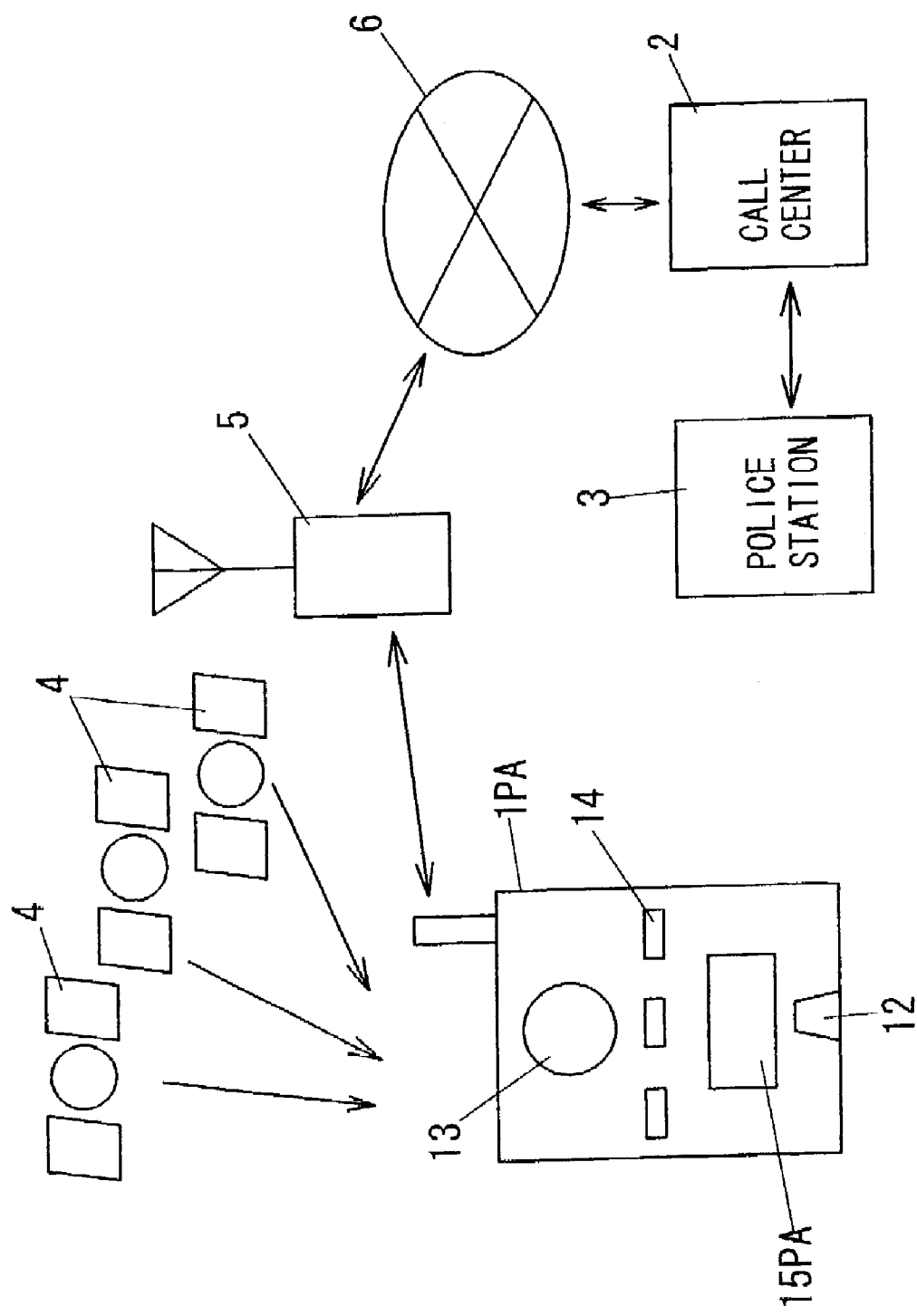
FIG. 29 is a schematic illustration of a conventional system with a portable radio communication terminal.
Figures 30A, 30B:
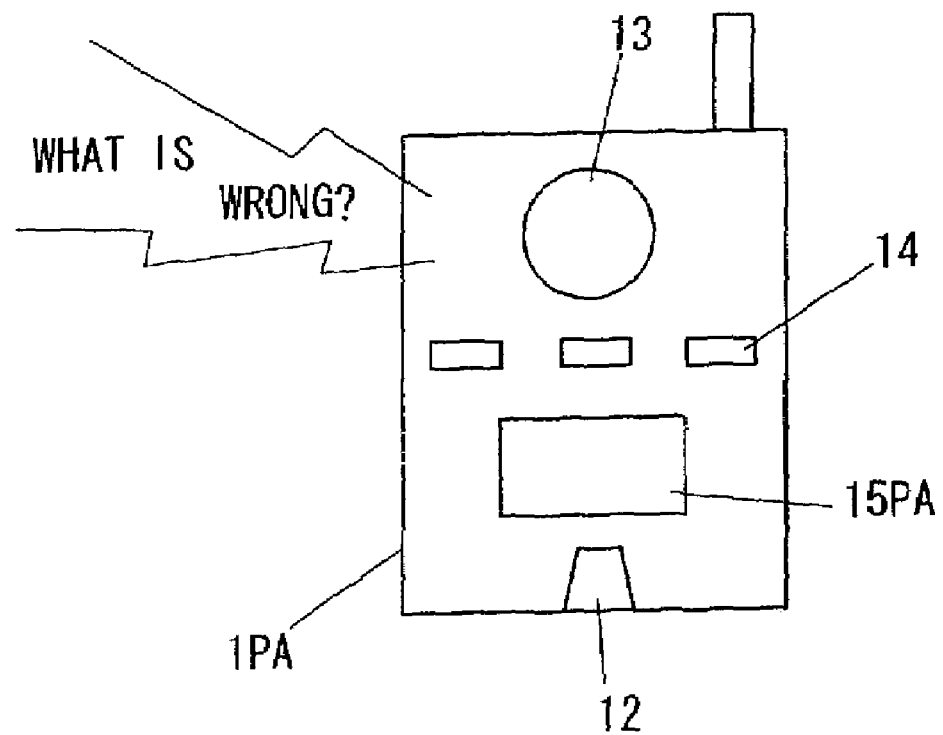
FIGS. 30A and 30B are diagrams explaining the action of the conventional portable radio communication terminal.

When the two normal mode switches 151a and 151b are pressed down at one time in the third judging mode as shown in FIG. 27, the action shifts to the static mode M2 where the microphone unit 12 remains turned on while the loudspeaker unit 13 and the light emitter 14 are turned off and the access via the radio transmitter/receiver 11 to the call center 2A is connected. Upon being demanded from the call center 2A for receiving an ID, the ID assigned to the portable radio communication terminal 1A is transmitted to the call center 2A together with a status data which indicates that the action is in the static mode M2. As the call center 2A accepts the ID, the communications between the portable radio communication terminal 1A and the call center 2A are thus permitted for exchange of data and voice sounds.

This is followed by Judging whether or not a voice signal received from the portable radio communication terminal 1A includes any characteristic voice data of the user stored in the registered data storage 22. More specifically, the judgment is conduced by a known voice recognition process where it is examined whether or not an audio data (picked up from the ambient field and) received from the portable radio communication terminal 1A includes any keyword related voice data of the user stored in the registered data storage 22. For example, when the voice data includes a voice data related to the keyword K1, it is judged that the user is alive but in a physical status defined by the keyword K1. The description data of the keyword K1 is read out from the registered data storage 22 and saved in a given memory. As the description data of the keyword K1 indicates that the user is calling with its pain, it is saved with the alive data of the user. Then, an emergency call to the police station is automatically released. Alternatively, the above data of the user may directly be transferred to the police station.

As described, this embodiment allows more details of the current status of the user to be obtained through the analyzing process thus encouraging to make an appropriate counter action. Also, the emergency call from the user can automatically be transferred to the police station even if the call center holds no operator. The second judging mode permits the psychological voice data of the user to be transmitted for ease of the understanding of the mental status. The third judging mode explains the current physical status of the user which can thus be understood with ease.

The present disclosure relates to subject matter contained in priority Japanese Patent Application No. 2002-168865, filed on Jun. 10, 2002, the contents of which is herein expressly incorporated by reference in its entirety.

What is claimed is:

1. A portable radio communication terminal, comprising:
a radio transmitter/receiver for transmitting and receiving signals over a public mobile communications network;
a voice input unit and a voice output unit for entering and releasing communication signals to be transmitted and received by the radio transmitter/receiver;
a light emitter for emitting light to indicate details of an action;
an operation entering unit; and
a mode selecting controller for, when a normal emergency call mode (referred to as a normal mode) of the action is selected with the operation entering unit, shifting the action to the normal mode where the voice input unit, the voice output unit, and the light emitter are turned on and the access via the radio transmitter/receiver to a predetermined emergency call station is connected, and, when a static emergency call mode (referred to as a static mode) of the action is selected with the operation entering unit, shifting the action to the static mode where the voice input unit remains turned on while the voice output unit and the light emitter are turned off and the access via the radio transmitter/receiver to the predetermined emergency call station is connected.

2. A portable radio communication terminal according to claim 1, wherein
the operation entering unit includes a normal mode switch and a static mode switch, and
the mode selecting controller is arranged for, when the normal mode switch is turned on, shifting the action to the normal mode or, when the static mode switch is turned on, shifting the action to the static mode.

3. A portable radio communication terminal according to claim 1, wherein
the operation entering unit includes two or more normal mode switches, and
the mode selecting controller is arranged for, when one of the normal mode switches is turned on, shifting the action to the normal mode or, when the normal mode switches all are turned on at one time, shifting the action to the static mode.

4. A portable radio communication terminal according to claim 1, wherein
the operation entering unit includes a normal mode switch and two or more static mode switches, and
the mode selecting controller is arranged for, when the normal mode switch is turned on, shifting the action to the normal mode or, when the static mode switches all are turned on at one time, shifting the action to the static mode.

5. A portable radio communication terminal according to claim 1, further comprising an external entry unit and an interface for connecting to the external entry unit, wherein
the mode selecting controller is arranged for, when the external entry unit remains connected by the interface and is operated, shifting the action to the static mode.

6. A portable radio communication terminal according to claim 1, further comprising a setting data storage unit, wherein
the mode selecting controller is arranged for, when receiving at the radio transmitter/receiver from a given call center a setting data for assigning the operation entering unit with a specific procedure for selecting between the normal mode and the static mode, storing the setting data in the setting data storage unit and notifying of setting with the specific procedure for selecting between the normal mode and the static mode with the use of a setting modifier and, when the operation entering unit is operated, examining on the basis of the setting data stored in the setting data storage unit whether the normal mode or the static mode is selected and performing a controlling action of the selected mode.

7. A portable radio communication terminal according to claim 6, wherein the setting modifier is at least either the voice output unit or the light emitter which can notify of setting with the specific procedure for selecting between the normal mode and the static mode.

8. A portable radio communication terminal according to claim 1, further comprising an external setting unit and an interface for connecting to the external setting unit, wherein
the mode selecting controller is arranged for, when receiving via the interface from the external setting unit a setting data for assigning the operation entering unit with a specific procedure for selecting between the normal mode and the static mode, storing the setting data in a setting data storage unit and, when the operation entering unit is operated, examining on the basis of the setting data stored in the setting data storage unit whether the normal mode or the static mode is selected and performing a controlling action of the selected mode.

9. A portable radio communication terminal according to claim 1, further comprising a GPS receiver and a current position determining unit for calculating the current position of the terminal from a GPS signal received by the GPS receiver, wherein
the mode selecting controller is arranged for, when the action is in the static mode, transmitting a signal of the current position calculated by the current position determining unit to a desired emergency call station which has been predetermined with the radio transmitter/receiver.

10. A portable radio communication terminal according to claim 9, wherein
the emergency call station is a given call center and
the mode selecting controller is arranged for, when receiving a request command from the emergency call station, transmitting the signal of the current position via the radio transmitter/receiver to the emergency call station.

11. A portable radio communication terminal according to claim 1, further comprising a voice data storage unit for storing inherent voice data of the user which has been registered, and a judging unit for judging whether a voice signal received from the voice input unit is equal to the inherent voice data of the user stored in the voice data storage, wherein
the mode selecting controller is arranged for, when the action is in the static mode and the judging unit confirms the presence of the user, transmitting a signal of the presence of the user to the emergency call station.

12. A portable radio communication terminal according to claim 1, further comprising a voice data storage unit for storing at least a frequency band and waveform of a psychological voice data of the user when having a fear, the frequency band and waveform of a psychological voice data of the user when having a tension, and the frequency band and waveform of a psychological voice data of the user when having an anger, and a judging unit for judging whether the voice signal received from the voice input unit is equal to one of the psychological voice data of the user stored in the voice data storage unit, wherein
the mode selecting unit is arranged for, when the action is in the static mode, transmitting a signal of the psychological voice data judged by the judging unit to the emergency call station.

13. A portable radio communication terminal according to claim 1, further comprising a voice data storage unit for storing voice data of keywords of a user which has been registered, a corresponding information storage unit for storing information about the keywords of the user, and a judging unit for judging whether a voice signal received from the voice input unit includes the voice data of any keyword of the user stored in the voice data storage, wherein
the mode selecting controller is arranged for, when the action is in the static mode and the judging unit confirms that the voice signal includes the voice data of a particular keyword, reading a piece of information about the keyword from the corresponding information storage and transferring its signal to the emergency call station.

14. A call center acting as an emergency call station preliminarily assigned to the portable radio communication terminal defined in claim 1, comprising:
a transmitter/receiver for transmitting and receiving signals over a public communications network;
a voice data storage unit for storing an inherent voice data of a user to be communicated between the transmitter/receiver and the radio transmitter/receiver of the portable radio communication terminal; and
a judging means for judging whether a voice signal received from the transmitter/receiver is equal to the inherent voice data of the user stored in the voice data storage.

15. A call center acting as an emergency call station preliminarily assigned to the portable radio communication terminal defined in claim 1, comprising:
a transmitter/receiver for transmitting and receiving signals over a public communications network;
a voice data storage unit for storing at least a frequency band and waveform of a psychological voice data of a user when having a fear, the frequency band and waveform of a psychological voice data of the user when having a tension, and the frequency band and waveform of a psychological voice data of the user when having an anger, the user being communicated between the transmitter/receiver and the radio transmitter/receiver of the portable radio communication terminal; and
a judger that determines whether a voice signal received from the transmitter/receiver is equal to any of the psychological voice data of the user stored in the voice data storage unit.

16. A call center acting as an emergency call station preliminarily assigned to the portable radio communication terminal defined in claim 1, comprising:
a transmitter/receiver for transmitting and receiving signals over a public communications network;
a voice data storage unit for storing voice data of keywords of a user to be communicated between the transmitter/receiver and the radio transmitter/receiver of the portable radio communication terminal;
a corresponding information storage unit for storing information about the keywords of the user; and
a judger that determines whether a voice signal received from the transmitter/receiver includes the voice data of any keyword stored in the voice data storage, wherein when the judger determines that the voice signal includes the voice data of a keyword, the information about the keyword is read out from the corresponding information storage unit.

* * * * *